United States Patent
Wu et al.

(10) Patent No.: US 9,608,944 B2
(45) Date of Patent: Mar. 28, 2017

(54) INFORMATION PROCESSING APPARATUS AND INFORMATION PROCESSING METHOD

(71) Applicants: BEIJING LENOVO SOFTWARE LTD., Beijing (CN); LENOVO (BEIJING) CO., LTD., Beijing (CN)

(72) Inventors: Xu Wu, Beijing (CN); Fa Wang, Beijing (CN); Yannan Chen, Beijing (CN); Fan Zhong, Beijing (CN); Hailiang Li, Beijing (CN)

(73) Assignees: BEIJING LENOVO SOFTWARE LTD., Beijing (CN); LENOVO (BEIJING) CO., LTD., Beijing (CN)

( * ) Notice: Subject to any disclaimer, the term of this patent is extended or adjusted under 35 U.S.C. 154(b) by 248 days.

(21) Appl. No.: 14/229,680

(22) Filed: Mar. 28, 2014

(65) Prior Publication Data

US 2015/0046834 A1    Feb. 12, 2015

(30) Foreign Application Priority Data

Aug. 9, 2013 (CN) .......................... 2013 1 0347531
Sep. 13, 2013 (CN) .......................... 2013 1 0419145

(51) Int. Cl.
*G06F 3/0482* (2013.01)
*H04L 12/58* (2006.01)
(Continued)

(52) U.S. Cl.
CPC ............ *H04L 51/04* (2013.01); *G06F 3/0481* (2013.01); *G06F 3/0482* (2013.01);
(Continued)

(58) Field of Classification Search
CPC .............................. G06F 3/0481; G06F 3/0482
(Continued)

(56) References Cited

U.S. PATENT DOCUMENTS 6,789,105 B2 *  9/2004  Ludwig ................. G06Q 10/10
                                              709/204
8,701,020 B1 *  4/2014  Fulcher ............... G06F 3/04883
                                              715/753
(Continued)

OTHER PUBLICATIONS

University of Liverpool, "Lynch 2010", available at <https://www.liverpool.ac.uk/media/livacuk/computingservices/software/Getting_started_with_Lync.pdf>, available on Jun. 2012, 36 pages.*

(Continued)

*Primary Examiner* — Reza Nabi
*Assistant Examiner* — Daniel Rodriguez
(74) *Attorney, Agent, or Firm* — Peter Su; Dentons US LLP

(57) ABSTRACT

Provided are an information processing method and apparatus being applicable to a first electronic device, comprising establishing a communication link between the first and a second electronic device; displaying a first communication interface; judging whether a predetermined condition is satisfied; and displaying a second communication interface when it is judged that the predetermined condition is satisfied; wherein the second communication interface comprises a first area and a second area, the first and second areas are at least partially overlapped, and the first area comprises a first subarea and/or a second subarea, the second subarea is used for displaying first information acquired by the first electronic device, the first subarea is used for displaying second information acquired by the second electronic device, the second area is used for displaying shared information, and at least a part of the shared information is simultaneously displayed on the first and second electronic device.

16 Claims, 13 Drawing Sheets

(51) Int. Cl.
*G06F 3/0484* (2013.01)
*G06F 3/0481* (2013.01)
*H04L 12/18* (2006.01)

(52) U.S. Cl.
CPC ...... *G06F 3/04842* (2013.01); *H04L 12/1827* (2013.01); *H04L 51/10* (2013.01)

(58) Field of Classification Search
USPC .......................................................... 715/748
See application file for complete search history.

(56) References Cited

U.S. PATENT DOCUMENTS

| | | | |
|---|---|---|---|
| 9,118,723 B1* | 8/2015 | Su | H04L 67/22 |
| 2007/0139516 A1* | 6/2007 | Lee et al. | 348/14.02 |
| 2008/0165160 A1* | 7/2008 | Kocienda | G06F 3/04883 |
| | | | 345/175 |
| 2011/0078573 A1* | 3/2011 | Ooba | G06F 9/4443 |
| | | | 715/733 |
| 2011/0115874 A1* | 5/2011 | Chang | H04N 7/147 |
| | | | 348/14.02 |
| 2012/0005269 A1* | 1/2012 | Janssen | G06F 3/0481 |
| | | | 709/203 |
| 2012/0069028 A1* | 3/2012 | Bouguerra | 345/473 |
| 2012/0084672 A1* | 4/2012 | Vonog | H04L 12/1827 |
| | | | 715/756 |
| 2013/0151620 A1* | 6/2013 | Deshpande | H04L 65/403 |
| | | | 709/204 |
| 2014/0108568 A1* | 4/2014 | Lee | 709/206 |
| 2014/0136999 A1* | 5/2014 | Leibovich et al. | 715/753 |
| 2014/0184530 A1* | 7/2014 | Hyun | G06F 1/1626 |
| | | | 345/173 |
| 2014/0282086 A1* | 9/2014 | Shi | H04L 51/046 |
| | | | 715/752 |
| 2014/0372890 A1* | 12/2014 | Qiu | H04N 21/472 |
| | | | 715/719 |
| 2015/0025882 A1* | 1/2015 | Park | H04L 65/403 |
| | | | 704/235 |
| 2015/0033296 A1* | 1/2015 | Yoshimura | H04L 65/403 |
| | | | 726/5 |

OTHER PUBLICATIONS

VSee, "VSee Tutorial—Sending file", available at <https://www.youtube.com/watch?v=6JY5ry5Q99Q>, available on Jul. 16, 2013, 4 pages.*

* cited by examiner

INFORMATION PROCESSING APPARATUS AND INFORMATION PROCESSING METHOD

CROSS-REFERENCE TO RELATED APPLICATIONS

This application claims the benefit under 35 U.S.C. §119 (a) of Chinese Patent Application No. 201310419145.0, filed on Sep. 13, 2013, and Chinese Patent Application No. 201310347531.3, filed on Aug. 9, 2013, the disclosures of which are incorporated by reference herein in their entireties.

TECHNICAL FIELD

The present disclosure relates to a field of information processing, in particular, to an information processing apparatus and an information processing method.

BACKGROUND

At present, network communication performed over a network, such as the Internet, through electronic devices, such as a mobile phone, a panel personal computer, a personal computer and the like, is increasingly wide. The network communication includes for example text communication, audio communication, video communication and the like. In a process of such communication, an electronic device participating in the communication, on one hand, sends information acquired by the electronic device per se to an electronic device of an opposite party, and on the other hand, outputs locally the information acquired by the electronic device of the opposite party and received from the electronic device of the opposite party and alternatively outputs the information acquired by the electronic device per se to realize the communication.

A network Instant Messenger (IM), as a communication tool that has been widely used, is not only applied to daily entertainments, but it is also widely used in work.

The IM, as a communication mode commonly used by the masses of computer Internet users, has a typical application of video communication. In a case of the video communication, two parties of the video communication feel like chatting with each other face-to-face, which is greatly convenient and has a better user experience.

Conventionally, a common communication interface in a process of video chat is shown in FIG. 1. When a user A turns on a chat window with a user B (hereinafter referred to as a current window 110), the current window 110 thereon has a message board 111, a first video window 112 is generally used for displaying a video image of the user B, a second video window 115 is generally used for displaying a video image of the user A; an input box 113 is used for inputting information, and a sending button 114 is used for sending information input in the input box 113. If the user A wants to share some pictures, news, micro blogs or games with the user B, he/she needs to input the above contents in the input box 113 and publish the same on the message board 111 to share with the user B.

However, in a process of implementing technical solutions of embodiments of the present disclosure, the inventor finds that when the video communication is performed, it is needed to share contents desired to be shared through the message window, thus it easily results in a problem of failing to synchronize the discussed contents in real time. Besides, this interface is inflexible, and thus the operation is inconvenient.

SUMMARY

Given the above situation, in embodiment of the present disclosure, an information processing apparatus and an information processing method are provided being capable of enabling the user to realize functions such as content sharing and application interaction, and the like, while performing communication over a network, such as video communication, and the like, thus diversifying functions that can be realized by the communication, strengthening interaction between two users of the communication, and intuitively closing the distance between the two users of the communication to greatly enrich the user's experience.

According to an embodiment of the present disclosure, provided is an information processing method being applicable to a first electronic device. The first electronic device comprises a first display unit and a communication unit and can communicate with a second electronic device through the communication unit. The information processing method comprises establishing a communication link between the first electronic device and the second electronic device; displaying a first communication interface used for communicating with the second electronic device on the first display unit; judging (or determining) whether a predetermined condition is satisfied and obtaining a judgment result; and displaying a second communication interface used for communicating with the second electronic device on the first display unit when the judgment result indicates that the predetermined condition is satisfied, wherein the second communication interface comprises a first area and a second area, the first area and the second area are at least partially overlapped. The first area comprises a first subarea and/or a second subarea, the second subarea is used for displaying first information acquired by the first electronic device, the first subarea is used for displaying second information acquired by the second electronic device, the second area is used for displaying shared information, and at least a part of the shared information is simultaneously displayed on the first electronic device and the second electronic device.

In an example, in the information processing method, the first electronic device is in video communication with the second electronic device through the communication unit, and the first communication interface comprises a first video communication window used for displaying a video frame acquired by and transmitted from the second electronic device. The predetermined condition is that a sharing start-up instruction has been obtained.

In an example, the information processing method further comprises obtaining a sharing start-up instruction used for starting up a shared screen, wherein the first area of the second communication interface comprises the first video communication window and the second area of the second communication interface comprises the shared screen possessing a first shared display area; displaying the first shared display area on the first display unit, wherein a first part of the first shared display area is at least overlapped with a second part of the first video communication window; transparency of the first part is a first transparency, so that a first user of the first electronic device can view the video frame in the first video communication window through the first shared display area, wherein in a process of displaying the first shared display area on the first display unit, when the second electronic device enables the shared screen, a first part of a second shared display area possessed by the shared screen on the second electronic device is overlappedly displayed on a second part of a second video communication window on the second electronic device, so that the second electronic device can synchronously display in the second shared display area an object displayed in the first shared display area.

In an example, the information processing method further comprises receiving a first operation at the side of the first electronic device; generating a first operation instruction according to the first operation; updating the shared information displayed in the second area according to the first operation instruction; and sending the first operation instruction to the second electronic device, wherein the second electronic device updates the at least part of the shared information displayed on the second electronic device, according to the first operation instruction.

In an example, the information processing method further comprises receiving a second operation instruction from the second electronic device; updating shared information displayed in the second area according to the second operation instruction; wherein the second operation instruction is generated by the second electronic device receiving a second operation at the side of the second electronic device.

In an example, in the information processing method, the first area comprises a prompt identification, and the first communication interface comprises the first area; the step of judging whether a predetermined condition is satisfied comprises one of the following: judging whether the prompt identification is triggered, or judging whether the shared information is received from the second electronic device.

In an example, in the information processing method, in a case that the step of judging whether a predetermined condition is satisfied comprises judging whether the prompt identification is triggered, the step of judging whether a predetermined condition is satisfied further comprises displaying a shared identification set when it is judged that the prompt identification is triggered, the shared identification set comprising at least one shared identification; and judging whether a shared identification in the shared identification set is triggered.

In an example, the information processing method further comprises displaying a first operation interface when it is judged that a first shared identification in the shared identification set is triggered. The first operation interface comprising a plurality of candidate information; judging whether shared information is determined from the plurality of candidate information; receiving a sharing operation for the shared information when it is judged that shared information is determined from the plurality of candidate information; and sending the shared information to the second electronic device in response to the sharing operation.

In an example, in the information processing method, the step of judging whether shared information is determined from the plurality of candidate information comprises detecting a predetermined operation for at least a first candidate information and a second candidate information in the plurality of candidate information; and determining the first candidate information and the second candidate information as the shared information in response to the predetermined operation; wherein the first candidate information has a different type from the second candidate information.

In an example, in the information processing method, the step of judging whether shared information is determined from the plurality of candidate information further comprises updating the first operation interface from an initial first state to a second state when the first candidate information and the second candidate information are determined from the plurality of candidate information as the shared information, a distance between the first candidate information and the second candidate information in the second state being less than that in the first state; receiving the sharing operation for the shared information; sending the shared information to the second electronic device in response to the sharing operation.

In an example, in the information processing method, the prompt identification is a turning-on shared screen button on the first communication interface or the first video communication window, the judgment result indicates that the predetermined condition is satisfied when the turning-on shared screen button is triggered, and the second communication interface is generated by setting first information acquired by the first electronic device in the second subarea, setting second information acquired by the second electronic device in the first subarea, and setting the second area not including any shared information.

In an example, in the information processing method, the step of judging whether shared information is determined from the plurality of candidate information comprises one of the following: judging whether a dragging operation of dragging at least one of the plurality of candidate information from the first operation interface to the second area is received, and judging whether an operation of selecting at least one from the plurality of candidate information and acknowledging the selected information is received.

In an example, the information processing method further comprises displaying a second operation interface when it is judged that a second shared identification in the shared identification set is triggered; receiving input information for the second operation interface; and obtaining shared information from a third electronic device being different from the first electronic device and the second electronic device based on the input information for the second operation interface.

In an example, in the information processing method, the second communication interface comprises a shared identification set, and the information processing method further comprises judging whether a third shared identification in the shared identification set is triggered after the second communication interface is displayed; generating a third communication interface based on only the second area or based on the second area and one of the first subarea and the second subarea; and displaying the third communication interface when it is judged that the third shared identification in the shared identification set is triggered.

In an example, in the information processing method, the step of judging whether a predetermined condition is satisfied further comprises displaying a reception prompt identification when it is judged that the shared information is received from the second electronic device; and judging whether the reception prompt identification is triggered.

In an example, in the information processing method, the step of displaying a second communication interface used for communicating with the second electronic device comprises generating the second communication interface through including the second area in the first area, and displaying the generated second communication interface.

In an example, in the information processing method, the step of obtaining a sharing start-up instruction comprises detecting whether there is a first object dragged to the first video communication window; and generating the sharing start-up instruction when it is detected that there is a first object dragged to the first video communication window.

In an example, when or after the sharing start-up instruction is generated, the information processing method further comprises generating a sharing instruction; displaying the first object on the first shared display area.

In an example, in the information processing method, a size of the first shared display area is larger than or equal to that of the first video communication window. In a case of the size of the first shared display area is equal to the size of the first video communication window, the first shared display area is completely overlapped with the first video communication window; in a case of the size of the first shared display area is larger than that of the first video communication window, a first part of the first shared display area is completely overlapped with the first video communication window and is taken as a public area, the remaining part of the first shared display area is taken as a private area, and a second object cannot be displayed on the second shared display area when it is displayed on the private area; a third object can be synchronously displayed on the second shared display area when it is displayed on the public area.

In an example, in the information processing method, a second object is operated in response to a first operation for the second object when the first operation is received; and a third object is operated in response to a second operation for the third object when the second operation is received and sending information of the second operation to the second electronic device, so that the second electronic device displays the third object and operates the third object displayed on the second shared display area based on the second operation.

In an example, in the information processing method, said displaying the first object on the first shared display area particularly comprises obtaining an ending position to which the first object is dragged; displaying the first object in an area on the first shared display area corresponding to the ending position.

In an example, the information processing method further comprises sending notification information to the second electronic device after the sharing start-up instruction is obtained, to notify the second electronic device to enable the shared screen.

In an example, the information processing method further comprises starting the shared screen if response information is received from the second electronic device during a predetermined period of time after the notification information is sent; or starting up the shared screen if response information from the second electronic device is not received during a predetermined period of time after the notification information is sent.

According to another embodiment of the present disclosure, provided is an information processing apparatus being applicable to a first electronic device. The first electronic device comprises a first display unit and a communication unit and can communicate with a second electronic device through the communication unit. The information processing apparatus comprises a link establishing unit for establishing a communication link between the first electronic device and the second electronic device; a first display processing unit for displaying a first communication interface used for communicating with the second electronic device on the first display unit; a predetermined condition judging unit for judging whether a predetermined condition is satisfied and obtaining a judgment result; and a second display processing unit for displaying a second communication interface used for communicating with the second electronic device on the first display unit when the judgment result indicates that the predetermined condition is satisfied; wherein the second communication interface comprises a first area and a second area, the first area and the second area are at least partially overlapped, and the first area comprises a first subarea and/or a second subarea, the second subarea is used for displaying first information acquired by the first electronic device, the first subarea is used for displaying second information acquired by the second electronic device, the second area is used for displaying shared information, and at least a part of the shared information is simultaneously displayed on the first electronic device and the second electronic device.

In an example, in the information processing apparatus, the first electronic device is in video communication with the second electronic device through the communication unit, the first communication interface comprises a first video communication window used for displaying a video frame acquired by and transmitted from the second electronic device; the predetermined condition is that a sharing start-up instruction has been obtained.

In an example, the information processing apparatus further comprises a start-up instruction obtaining unit for obtaining a sharing start-up instruction, the sharing start-up instruction being used for starting up a shared screen; wherein the first area of the second communication interface comprises the first video communication window and the second area of the second communication interface comprises the shared screen, the shared screen possessing a first shared display area.

In an example, in the information processing apparatus, the first shared display area is displayed on the first display unit; wherein a first part of the first shared display area is at least overlapped with a second part of the first video communication window; transparency of the first part is a first transparency, so that a first user of the first electronic device can view the video frame in the first video communication window through the first shared display area; wherein in a process of displaying the first shared display area on the first display unit, when the second electronic device enables the shared screen, a first part of a second shared display area possessed by the shared screen on the second electronic device is overlappedly displayed on a second part of a second video communication window on the second electronic device, so that the second electronic device can synchronously display in the second shared display area an object displayed in the first shared display area.

In an example, the information processing apparatus further comprises a first operation receiving unit for receiving a first operation at the side of the first electronic device; a first operation instruction generating unit for generating a first operation instruction according to the first operation; an updating unit for updating the shared information displayed in the second area according to the first operation instruction, and the first operation instruction sending unit for sending the first operation instruction to the second electronic device; wherein the second electronic device updates the at least part of the shared information displayed on the second electronic device according to the first operation instruction.

In an example, the information processing apparatus further comprises a second operation instruction receiving unit for receiving a second operation instruction from the second electronic device, wherein the second operation instruction is generated by the second electronic device receiving a second operation at the side of the second electronic device, and wherein the updating unit updates shared information displayed in the second area according to the second operation instruction.

In an example, in the information processing apparatus, the first area comprises a prompt identification, and the first communication interface comprises the first area; the predetermined condition judging unit comprises one of the following a prompt triggering judging unit for judging whether the prompt identification is triggered; a shared reception judging unit for judging whether the shared information is received from the second electronic device.

In an example, in the information processing apparatus, in a case that the predetermined condition judging unit comprises the prompt triggering judging unit, the predetermined condition judging unit further comprises a shared identification display processing unit for displaying a shared identification set when it is judged that the prompt identification is triggered, the shared identification set comprising at least one shared identification; and a shared identification judging unit for judging whether a shared identification in the shared identification set is triggered.

In an example, the information processing apparatus further comprises a first operation interface displaying unit for displaying a first operation interface when it is judged that a first shared identification in the shared identification set is triggered, the first operation interface comprising a plurality of candidate information; a shared information determining unit for judging whether shared information is determined from the plurality of candidate information; a sharing operation receiving unit for receiving a sharing operation for the shared information when it is judged that the shared information is determined from the plurality of candidate information; and a shared information sending unit for sending the shared information to the second electronic device in response to the sharing operation.

In an example, in the information processing apparatus, the shared information determining unit comprises a detecting unit for detecting a predetermined operation for at least a first candidate information and a second candidate information in the plurality of candidate information; and a determining unit for determining the first candidate information and the second candidate information as the shared information in response to the predetermined operation; wherein the first candidate information has a different type from the second candidate information.

In an example, the information processing apparatus further comprises a second operation interface displaying unit for displaying a second operation interface when it is judged that a second shared identification in the shared identification set is triggered; an input information receiving unit for receiving input information for the second operation interface; and an obtaining unit for obtaining shared information from a third electronic device being different from the first electronic device and the second electronic device based on the input information for the second operation interface.

In an example, in the information processing apparatus, the prompt identification is a turning-on shared screen button on the first communication interface, the start-up instruction obtaining unit obtains the sharing start-up instruction when the turning-on shared screen button is triggered, the judgment result obtained by the predetermined condition judging unit indicates that the predetermined condition is satisfied, and the second display processing unit generates the second communication interface by setting first information acquired by the first electronic device in the second subarea, setting second information acquired by the second electronic device in the first subarea, and setting the second area not including any shared information.

In an example, in the information processing apparatus, the start-up instruction obtaining unit detects whether there is a first object dragged to the first video communication window and generates the sharing start-up instruction when it is detected that there is a first object dragged to the first video communication window.

In an example, the information processing apparatus further comprises a sharing instruction obtaining unit. When or after the sharing start-up instruction is generated, the sharing instruction obtaining unit generates a sharing instruction, wherein the second display processing unit displays the first object on the first shared display area based on the sharing instruction.

In an example, in the information processing apparatus, a size of the first shared display area is larger than or equal to that of the first video communication window. In a case of the size of the first shared display area is equal to that of the first video communication window, the first shared display area is completely overlapped with the first video communication window; in a case of the size of the first shared display area is larger than that of the first video communication window, a first part of the first shared display area is completely overlapped with the first video communication window and is taken as a public area, the remaining part of the first shared display area is taken as a private area, and a second object cannot be displaced on the second shared display area when it is displayed on the private area; a third object can be synchronously displayed on the second shared display area when it is displayed on the public area.

In an example, in the information processing apparatus, a first operation instruction generating unit generates a first operation instruction in response to a first operation for the second object when the first operation receiving unit receives the first operation, and the updating unit operates the second object according to the first operation instruction; and the first operation instruction generating unit generates the first operation instruction in response to a second operation for the third object when the first operation receiving unit receives the second operation, and the updating unit operates the third object according to the first operation instruction, and the first operation instruction sending unit sends the first operation instruction corresponding to the second operation to the second electronic device, so that the second electronic device displays the third object and operates the third object displayed on the second shared display area based on the second operation.

In an example, in the information processing apparatus, the second display processing unit displaying the first object on the first shared display area based on the sharing instruction particularly comprises obtaining an ending position to which the first object is dragged; displaying the first object in an area on the first shared display area corresponding to the ending position.

In an example, the information processing apparatus further comprises a sending unit for sending notification information to the second electronic device after the start-up instruction obtaining unit obtains the sharing start-up instruction, to notify the second electronic device to enable the shared screen.

In an example, the information processing apparatus further comprises a response message receiving unit for receiving a response message for the notification information from the second electronic device; in a case of the response message receiving unit receives the response message sent from the second electronic device during a predetermined period of time after the sending unit sends the notification information, the second display processing unit starts up the shared screen; or in a case of the response message receiving unit does not receive the response message sent from the second electronic device during a predetermined period of time after the sending unit sends the notification information, the second display processing unit starts up the shared screen.

In the information processing method and the information processing apparatus of the embodiments of the present disclosure, information sharing and interaction can be realized between the user of the first electronic device and the user of the second electronic device by using the communication link at the same time when the user of the first electronic device is in communication with the user of the second electronic device, so as to sensuously close the distance between the users participating in the communication, thus greatly enriching and improving the user's experience.

In particular, in an embodiment of the present disclosure, a shared screen is enabled based on a sharing start-up instruction. A first shared display area is at least partially and overlappedly displayed on a display area in which a first video communication window of a first electronic device is. Transparency of a part of the first shared display area being overlapped with the first video communication window is a first transparency. Under the first transparency, a first user of the first electronic device can view a video frame in the first video communication window through the first shared display area. In the process of displaying the first shared display area on the first display unit, when the second electronic device enables the shared screen, a first part of a second shared display area possessed by the shared screen on the second electronic device is overlappedly displayed in a second part of a second video communication window on the second electronic device, so as to make the second electronic device synchronously display on the second shared display area the object displayed on the first shared display area, so that the second user corresponding to the second electronic device can view the object, for example, if a user A corresponding to the first electronic device wants to share a picture with a user B corresponding to the second electronic device, then the picture can be displayed on the first shared display area, and the picture displayed on the shared screen on the first electronic device can be also displayed on the second shared display area, i.e., on the second display unit of the second electronic device, then the user B can view the picture. In this way, the users A and B can discuss over the picture, to realize simultaneously sharing the discussed content in the process of video communication.

Further, in the embodiment of the present disclosure, a sharing start-up instruction can be generated by triggering a turning-on shared screen button provided on the first communication interface, so that a sharing start-up operation may be simpler and be more convenient for the user to use.

Further, in the embodiment of the present disclosure, the shared screen is divided into a private area and a public area. An object may not be shared with the second electronic device when the object is in the private area, and an object can be shared with an opposite party only when the object is displayed in the public area. Therefore, privacy of the user can be protected at the same time when a synchronous sharing is realized. Further, for an object in the private area, the first user's operation on the object is invisible for the second electronic device, and only the first electronic device responds to this operation; on the other hand, for an operation specific to an object in the public area, then the operation is visible for the second electronic device, and the second electronic device may also respond to the operation.

Further, in the embodiment of the embodiment, the shared screen is enabled by detecting that there is a first object being dragged to the first video communication window to generate a start-up instruction, so that the operation is simpler and more convenient for the user to use when the shared screen is enabled.

Further, in the embodiment of the present disclosure, the public area is in particular an area being overlapped with the video communication window, that is, the shared content is superimposed on the video communication window, so that video chatting and shared content viewing can be performed simultaneously, thus a discussion of the shared content will be performed in a more intuitive, convenient and synchronous way.

DETAILED DESCRIPTION

Below will be a detailed description of embodiments of the present disclosure by referring to the accompanying drawings.

First, a technical problem that discussed contents cannot be simultaneously shared in the process of conventional video communication is solved according to an information processing method in an embodiment of the present disclosure.

The information processing method of the embodiment of the present disclosure is applicable to an electronic device. The electronic device is such as a mobile phone, a panel personal computer, a personal computer, and the like. The electronic device possesses a communication unit used for communicating with other electronic devices. The electronic device may further possess an audio acquisition unit such as a microphone and a video acquisition unit such as a camera used for acquiring input information. In addition, the electronic device may further possess an audio output unit such as a loudspeaker and a video output unit such as a display used for outputting corresponding information. In the below description, the electronic device is referred to as a first electronic device and an electronic device communicating with the electronic device is referred to as a second electronic device when appropriate.

Figure 1:
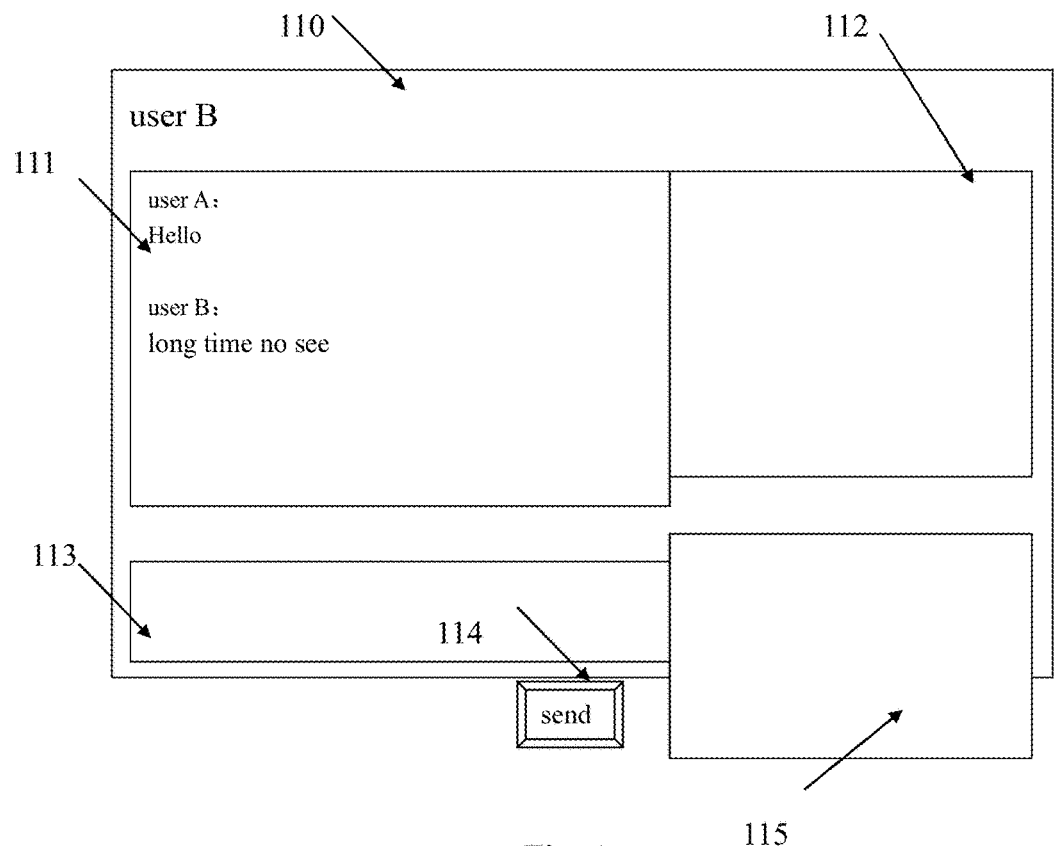
FIG. 1 is a conventional video communication window.
Figure 2:
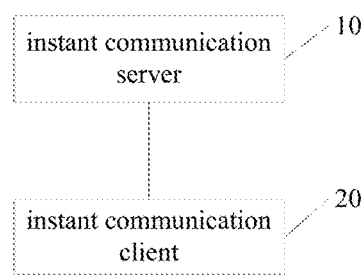
FIG. 2 is a diagram illustrating a structure of an instant communication system, according to an embodiment of the present disclosure.

In actual application, the communication unit further comprises elements such as a camera, a network card, microphone, a voice processing chip and the like used for realizing video communication. Further, this method may be applicable to a video communication system, for example, an instant communication system. Please referring to FIG. 2, the instant communication system comprises an instant communication server 10 and instant communication clients 20 (hereinafter referred to as clients 20), wherein the instant communication server 10 is connected with a plurality of clients 20 and keeps data of contacts of the clients 20. A user can perform text, voice or video interaction with his/her contacts via the instant communication server 10 through a dialog box after logging in and entering into the system at a client 20; of course, also, the user can directly perform text, voice or video interaction with his/her contacts via the client 20 resident on his/her electronic device through a dialog box after logging in and entering into the system. The clients 20 are installed on the first electronic device and the second electronic device respectively used for realizing that a user A corresponding to the first electronic device is in video communication with a user B corresponding to the second electronic device.

Below will be a detailed description of the information processing method in the embodiment of the present disclosure by referring to FIG. 3. The information processing method is applicable to a first electronic device comprising a first display unit and a communication unit. The first electronic device can communicate with the second electronic device through the communication unit.

Figure 3:
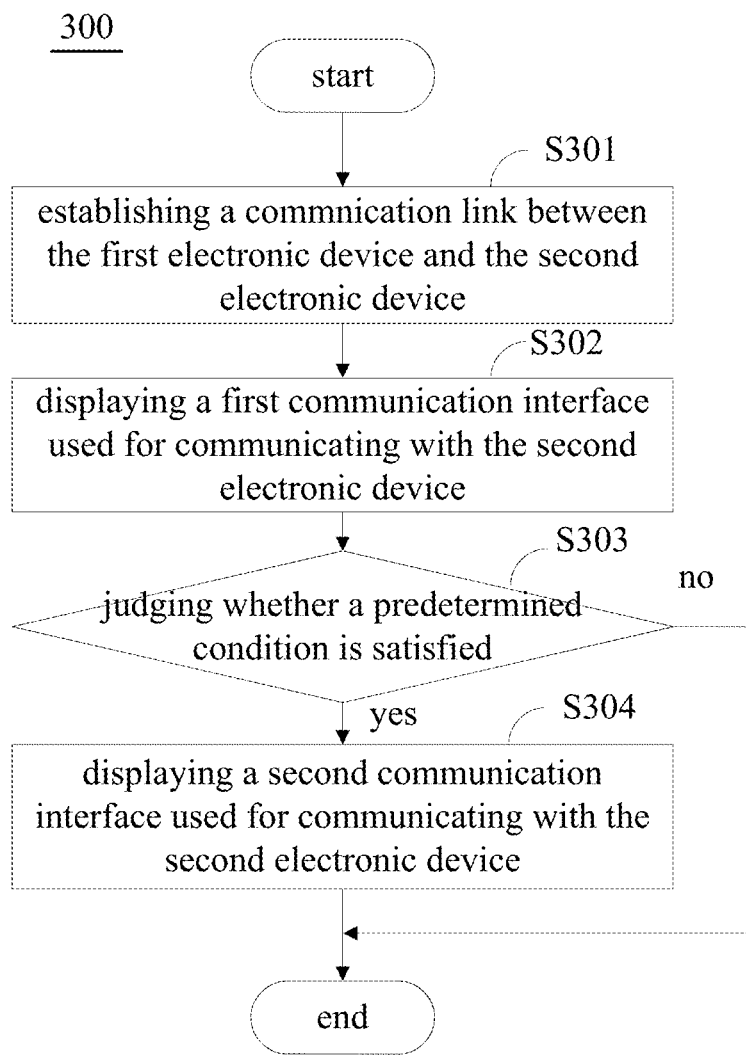
FIG. 3 is a flowchart illustrating an information processing method according to an embodiment of the present disclosure.

As shown in FIG. 3, an information processing method 300 of the embodiment of the present disclosure starts. First, at step S301, a communication link is established between the first electronic device and the second electronic device.

That is, for example, the information processing method establishes a communication link between the first electronic device and the second electronic device when the first electronic device requests to communicate with the second electronic device and the second electronic device acknowledges the request or when the second electronic device requests to communicate with the first electronic device and a first user of the first electronic device acknowledges the request.

Next, at step S302, the information processing method displays a first communication interface used for communicating with the second electronic device on the first display unit. The first communication interface comprises at least one of a first subarea used for displaying second information acquired by the second electronic device and a second subarea used for displaying first information acquired by the first electronic device. For example, in a case of video communication, the first subarea is used for displaying an image of a second user at the opposite party side (at the side of the second electronic device, that is, the second electronic device side), and the second subarea is used for displaying an image of the first user at the current side (at the side of the first electronic device, that is, the first electronic device side). An area formed by the first subarea and the second subarea can be referred to as a first area.

Later, at step S303, the information processing method judges whether a predetermined condition is satisfied, to obtain a judgment result.

The information processing method ends when the information processing method judges that the predetermined condition is not satisfied.

On the other hand, when the information processing method judges that the predetermined condition is satisfied, the information processing method moves to step S304. At step S304, the information processing method displays a second communication interface used for communicating with the second electronic device.

For example, the predetermined condition may be that the first user wants to share content with the second user. In this case, the information processing method displays the second communication interface used for communicating with the second electronic device. In other words, in this case, a shared screen can be started up to share the content.

In particular, the second communication interface can comprise the first area as described above and the other second area. The first area and the second area are not completely the same. The second area is used for displaying shared information. A meaning of the shared information herein is that at least a part of the shared information can be simultaneously displayed on the first electronic device and the second electronic device.

In addition, although the above is the description by taking the display information sharing as an example, those skilled in the art can understand that the shared information may also be audio information. In a case of the audio communication, at least a part of the audio information can be simultaneously output from the first electronic device and the second electronic device. Details of the shared information will be described later in detail in combination with several particular examples.

In addition, in the information processing method of the embodiment of the present disclosure, the second communication interface can be generated and displayed by comprising the second area in the first area. For example, the information processing method for example may superimpose the second area used for displaying the shared information on at least a part of the first area by taking the first area that displays information of one of the two parties of communication (video, text, etc.) as a background. Display parameters such as luminance, grayscale and transparency and the like of the first area and the second area may be different, to make it convenient for the user to differentiate between the first area and the second area.

Thus, the information processing method of the embodiment of the present disclosure can naturally superimpose the second communication interface based on the original first communication interface, so that the process of appearance and display of the second communication interface is natural and unobtrusive. In addition, in a case that the display area of an electronic device such as a mobile phone and the like is limited, the information processing method of the embodiment of the present disclosure can effectively save a total area needed to be occupied by the communication interfaces, so as to fully utilize the display area to display a larger image.

The second area in the second communication interface used for displaying the shared information can be referred to as a shared screen.

Below will be an introduction of a specific implementation example of the information processing method in the present embodiment by referring to FIG. 4.

As described above, at step S302, the information processing method displays a first communication interface used for communicating with the second electronic device. In particular, the first electronic device is in video communication with the second electronic through the communication unit. The first communication interface may comprise a first video communication window being displayed on the first display unit. In particular, the first video communication window may be established when the first electronic device initiatively starts up a request for video communication and the second electronic device accepts the request for video communication; or the first video communication window may be established when the second electronic device initiatively starts up a request for video communication and the first electronic device accepts the request for video communication. Further, in actual application, the first video communication window may be displayed on any position of the first display unit, and may only occupy a part of the display area of the first display unit, or may be displayed in full screen.

Step S401 is in substance a specific implementation mode of step S302. In particular, at step S401, the first video communication window is displayed on the first display unit. The first video communication window is used for displaying a video frame acquired by and transmitted from the second electronic device. The first user corresponding to the first electronic device can view the image of the second user acquired by the second electronic device through displaying the video frame acquired by and transmitted from the second electronic device in the first video communication window.

Next, at step S402, a sharing start-up instruction is obtained. The sharing start-up instruction is used for starting up a shared screen. At step S403, the shared screen is enabled in response to the sharing start-up instruction. The shared screen possesses a first shared display area. In particular, the first area of the second communication interface comprises the first video communication window, and the second area of the second communication interface comprises the shared screen, and the shared screen possesses a first shared display area.

Then, at step S404, the first shared display area is displayed on the first display unit; wherein a first part of the first shared display area is at least overlapped with a second part of the first video communication window; transparency of the first part is a first transparency, so that the first user of the first electronic device can view the video frame in the first video communication window through the first shared display area.

In the process of displaying the first shared display area on the first display unit, the second electronic device enables the shared screen, the first part of the second shared display area possessed by the shared screen on the second electronic device is overlappedly displayed on the second part of a second video communication window on the second electronic device, so that the second electronic device can synchronously display on the second shared display area the object displayed on the first shared display area.

Of course, the above arrangement manner of the second communication interface is just for illustration, and those skilled in the art can understand that the information processing method may generate and display the second communication interface in other manners. For example, the information processing method may generate and display the second communication interface by an arrangement manner of the first area being adjacent to the second area (for example, arranging side by side) or by other arrangement manners.

Regarding the predetermined condition, in a first embodiment, the information processing method can judge whether the first user at the first electronic device side triggers a prompt identification used to start up sharing (i.e., start-up prompt identification). The prompt identification may be for example arranged in the first area. As an example, the prompt identification can be superposed with the displayed image for the first electronic device side or the displayed image for the second electronic device side. That is, in this example, the information processing method judges whether the first user at the first electronic device side desires to initiatively start up sharing. For example, the prompt identification may be a turning-on shared screen button on the first communication interface or the first video communication window. The judgment result indicates that the predetermined condition is satisfied when the turning-on shared screen is triggered. The second communication interface is generated by setting the first information acquired by the first electronic device in the second subarea, setting the second information acquired by the second electronic device in the first subarea, and setting the second area not including any shared information.

In a second example, the information processing method may judge whether the shared information is received from the second electronic device. The shared information may be a document such as a picture, an audio or a video and the like, or may be an application program or user data in the application program. The second communication interface is displayed when it is judged that the shared information is received from the second electronic device. That is, in this example, the information processing method judges whether the first user at the first electronic device side receives information shared by the second electronic device, and directly starts up and displays the second communication interface when the shared information is received, thus simplifying the user's operation.

Further, the information processing method may further display a reception prompt identification when it is judged that the shared information is received from the second electronic device. The reception prompt identification for example may be displayed in a form of a pop-up window. Alternatively, the reception prompt identification may also be displayed through modifying the prompt identification used to start up sharing (for example, adding a mark representative of having received the shared information).

Of course, the display form and display position for the above start-up prompt identification and reception prompt identification are just for illustration. Those skilled in the art can design other various reception prompt identifications and start-up prompt identifications and their display forms and display positions according to the needs. The information processing method displays the second communication interface only when it is judged that the reception prompt identification is triggered, so that the user at the first electronic device side can receive or refuse the shared information according to the needs, thus enriching the user's selection and enhancing the user's experience.

In addition, after the shared information is simultaneously displayed on the first electronic device and the second electronic device, the information processing method of the embodiment of the present disclosure can further enable the first user at the first electronic device side and the second user at the second electronic side to operate the shared information, so as to update the shared information.

In particular, in this embodiment, the information processing method can receive a first operation at the first electronic device side and generate a first operation instruction according to the first operation. For example, in a case of image sharing, the information processing method can receive the first user's operations of enlarging, reducing, switching, and the like on the displayed image and generate corresponding operation instructions. For another example, in a case of game sharing, the information processing method can receive the first user's operation on the running game and generate a corresponding instruction. For another example, in a case of video sharing, the information processing method can receive the first user's operations of fast forwarding, back warding and pausing and the like on the displayed video and generate corresponding instructions.

Later, on one hand, the information processing method updates the shared information displayed in the second area according to the first operation instruction, that is, performs a corresponding operation according to the first operation instruction. On the other hand, the information processing method sends the first operation instruction to the second electronic device, such that the shared information displayed on the second electronic device is updated by the second electronic device according to the first operation instruction.

Correspondingly, when the second user at the second electronic device side performs a second operation to generate a second operation instruction, the first electronic device can receive the second operation instruction from the second electronic device and update the shared information displayed in the second area according to the second operation instruction.

Thus, the information processing method in the embodiment of the present disclosure enables the users of both the first electronic device and the second electronic device to operate the shared information and to reflect operation results on the electronic device of the opposite party, thus strengthening real-time interaction feel of users at the two sides and enhancing the user's experience.

Figure 4:
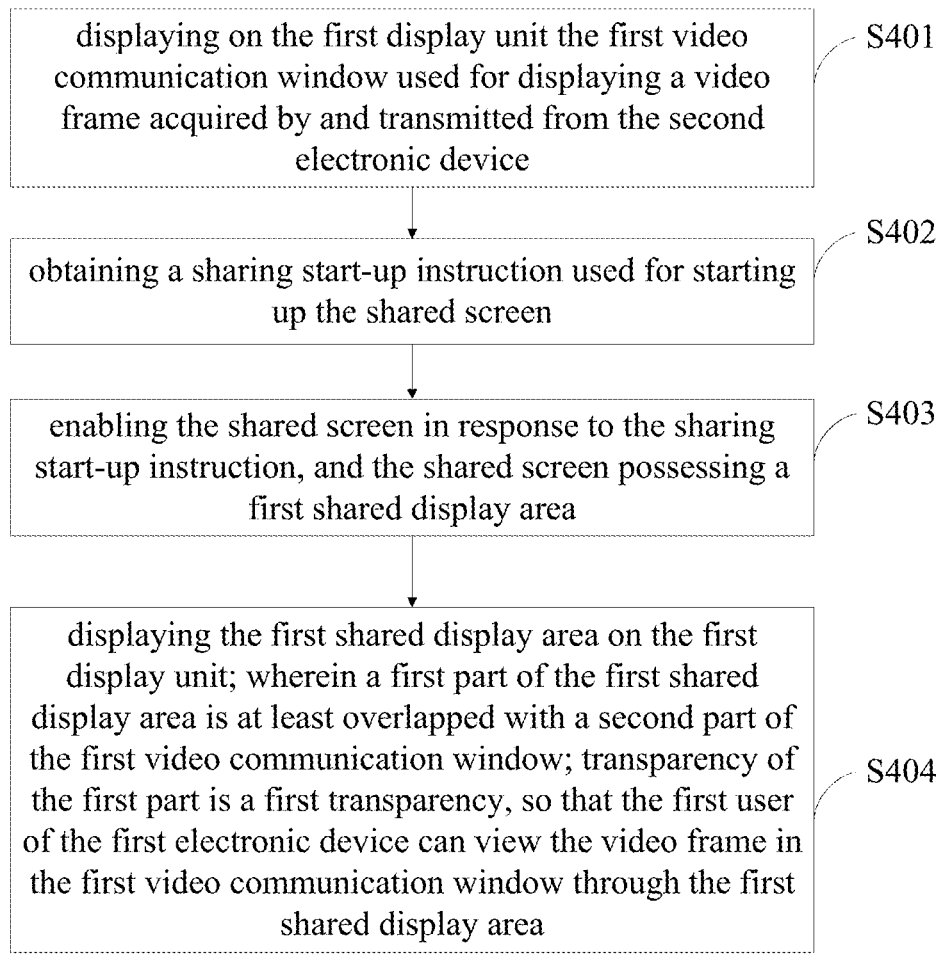
FIG. 4 is another flowchart illustrating an information processing method in an embodiment of the present disclosure.

The above are descriptions of the information processing method of the embodiment of the present disclosure by referring to FIGS. 3-4. In the information processing method of the embodiment of the present disclosure, information sharing and interaction can be realized between the user of the first electronic device and the user of the second electronic device using the communication link at the same time when the user of the first electronic device is in communication with the user of the second electronic device, so as to sensuously close the distance between the users participating in the communication, thus greatly enriching and improving the user's experience.

Below will be a detailed description of the information processing method of the embodiment of the present disclosure in combination with specific embodiments by referring to diagrams of FIGS. 5-14.

First Embodiment

Below will be a description of the first embodiment by referring to FIGS. 5-6.

In actual application, there are several of implementation modes for triggering a display of a second communication interface (i.e., a display of a shared screen). Below will be a detailed introduction by taking examples in combination with a user side and a device side.

In actual application, i.e., at step S402, a sharing start-up instruction is obtained. There may be particularly the following two situations.

The first situation is to obtain the sharing start-up instruction directly. For example, the user clicks a "turning-on shared screen" button on the video communication window; for another example, a corresponding floating menu may be displayed by clicking the right key of the mouse or long pressing any position of the video communication window, then a "turning-on shared screen" option is selected. In this way, the first electronic device directly obtains the sharing start-up instruction, and then the shared screen is enabled based on this instruction.

The second situation is to obtain the sharing start-up instruction indirectly. For example, the user selects a picture, triggers a floating menu by clicking the right key of the mouse, or long pressing the picture, then selects a "sharing" option. At this time, the electronic device will generate two instructions, i.e., a start-up instruction and a sharing instruction. Firstly, the shared screen is enabled based on the start-up instruction, and then a display object is displayed on the shared screen based on the sharing instruction.

For another example, in a case of the second situation, the step S402 particularly can comprise detecting whether there is a first object being dragged to the first video communication window; the sharing start-up instruction is generated when it is detected that there is a first object being dragged to the first video communication window. For example, the user drags a picture to the first video communication window, and at this time, the first electronic device detects this operation and the sharing start-up instruction is generated. In this way, the operation is enabled to be simpler and more convenient for the user to use, and instructions, to which the first electronic device needs to respond, are relatively less, and thus, the response speed will be faster.

Further, when or after the start-up instruction is generated, the information processing method further comprises generating a sharing instruction used for displaying a first object on a first shared display area; displaying the first object on the first shared display area based on the sharing instruction when the first shared display area is displayed on the first display unit. By still taking the above-stated example as an example, the dragged picture will be displayed on the first shared display area.

Further, in this example, displaying the first object on the first shared display area particularly comprises obtaining an ending position to which the first object is dragged; displaying the first object in an area on the first shared display area corresponding to the ending position. In particular, for example, the ending position is taken as a center of the area of the displayed picture, for another example, the ending position is taken as the upper left corner of the area of the displayed picture, and of course, the ending position can also be taken as the upper right corner of the area of the displayed picture, to which the present embodiment does not particularly limit.

Alternatively, the shared screen can be displayed without additional triggering; instead, the shared screen is enabled at the same time when the first video communication window is established. For example, the shared screen is enabled when the user A initiatively starts up the video communication request and the user B accepts the request or when the first electronic device accepts the video communication request sent from the second electronic device. Of course, such implementation mode can be understood as the above-described second situation, that is, it belongs to the situation of obtaining the start-up instruction indirectly.

Of course, in actual application, the shared screen may also be enabled in other manners, to which the present application does not particularly limit.

No matter which manner is adopted to enable the shared screen, the shared screen has the first shared display area. Next, step S404 is performed, i.e., displaying the first shared display area on the first display unit, wherein a first part of the first shared display area is at least overlapped with a second part of the first video communication window; transparency of the first part is a first transparency, so that the first user of the first electronic device can view a video frame in the first video communication window through the first shared display area.

In the embodiment of the present disclosure, a size of the shared screen may be smaller than, or larger than or equal to that of the first video communication window, only if the first part of the first shared displayed area is at least overlapped with the second part of the first video communication window, that is, the first shared display area and the first video communication window are at least partially overlapped, and the first shared display area may also be completely overlapped with the first video communication window, that is, the first part of the first shared display area is completely overlapped with the first video communication window, for example, the first shared display area completely covers the first video communication window, or the first video communication window is completely superimposed on the first shared display area. Below will be a description by taking FIGS. 5a-5c as an example.

Figure 5A:
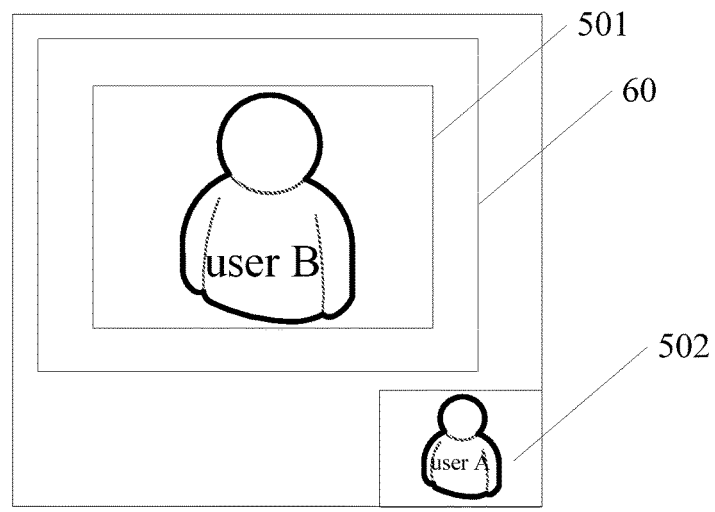
FIGS. 5a-5c are schematic diagrams illustrating a position relationship of a video communication window and a shared display area in an embodiment of the present disclosure.

First, please referring to FIG. 5a, the first display unit has two video communication windows, i.e., a video communication window 501 used for displaying a video image of a user B and a video communication window 502 used for displaying a video image of a user A. In general, the video communication window 501 is larger than the video communication window 502. For the users A and B, the video window of the opposite party is generally predominant and occupies a larger display area to be displayed, but the video window of the current party may also be predominant. In FIG. 5a, the video communication window 501 of the user B is predominant and occupies a majority of the display area of the first display unit, while the video communication window 502 of the user A is located at the lower right corner of the first display unit and occupies a smaller display area. "The first video communication window" in "the first part of the first shared display is at least overlapped with the second part of the first video communication window" in FIG. 5a may be either the video communication window 501 or the video communication window 502 or a combination of the video communication window 501 and the video communication window 502.

In a first case, the first video communication window takes the situation of only including the video communication window 501 as an example. As shown in FIG. 5a, a first shared display area 60 completely covers the video communication window 501, but does not cover the video communication window 502, and the size of the first shared display area is larger than that of the video communication window 501.

Figure 5B:
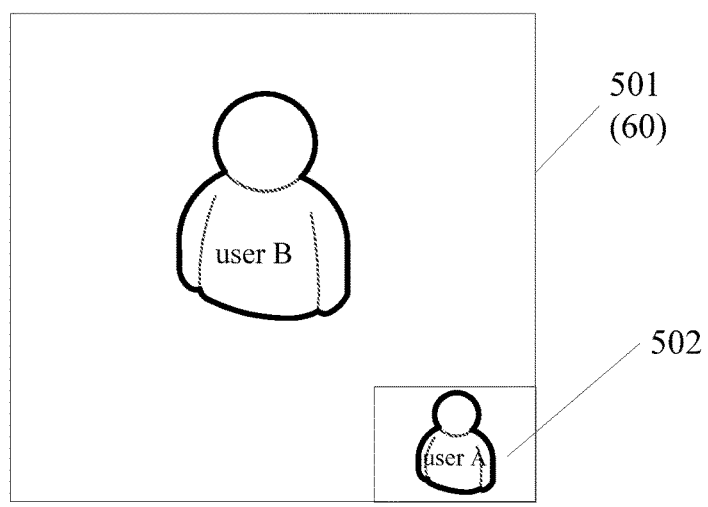

In a second case, please referring to FIG. 5b, the video communication window 501 is displayed in full screen, i.e., occupying all the display area of the first display unit, the video communication window 502 is overlappedly displayed at the lower right corner of the first display unit and occupies a smaller display area. In FIG. 5b, the first video communication window takes the situation of including both the video communication window 501 and the video communication window 502 as an example. The first shared display area 60 completely covers the video communication window 501 and the video communication window 502, and the size of the first shared display area 60 is equal to that of the video communication window 501.

Figure 5C:
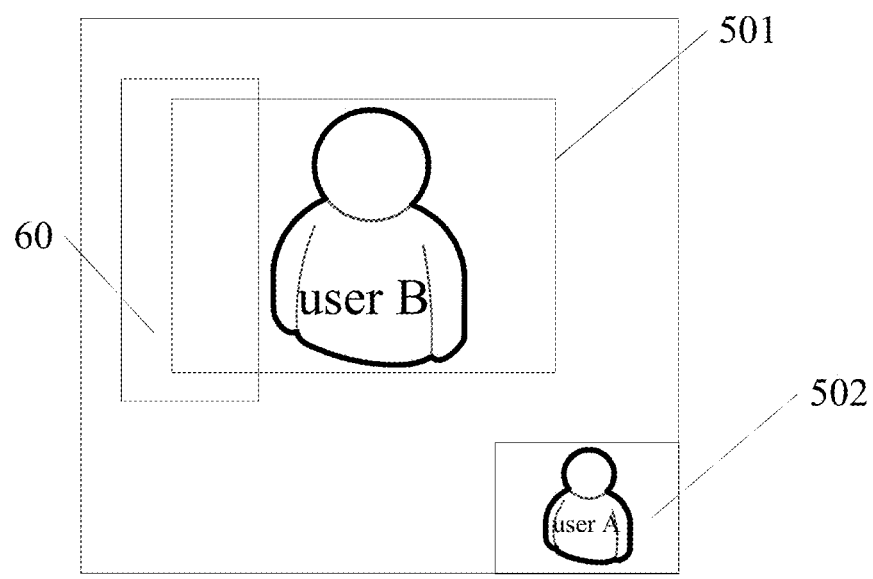

In a third case, please referring to FIG. 5c, similar to the first case, a difference is that in FIG. 5c, the first shared display area 60 particularly covers the video communication window 501, and the size of the first shared display area 60 is smaller than that of the video communication window 501.

The above are just for illustration, and there may be other cases in actual application. For example, as shown in FIG. 5a, similar to the first case, only that the video communication window includes the video communication window 501 and the video communication window 502, and the first shared display area 60 completely covers the video communication window 501 and the video communication window 502. In order to make the specification brief, details omitted.

No matter which case it is, a determination of the size and position of the first shared display area can be performed in the following way: obtaining position information of the video communication window, and determining the position and size of the first shared display area based on position information and the size rule. In actual application, obtaining the position information of the video communication window is in particular for example obtaining central position information and boundary position information of the video communication window and determining the position and size of the first shared display area based on the position information and size rule. For example, the position rule may be that the central position of the first shared display area and the central position of the video communication window are overlapped, while the size rule is that the boundary position of the first shared display area goes beyond the boundary position of the video communication window with a distance of N, wherein N is an integer larger than or equal to 0. Alternatively, for another example, the position rule may be that the central position of the first shared display area may be determined randomly, only if the size rule is satisfied, that is, the boundary position of the first shared display area goes beyond the boundary position of the video communication window with a distance of N. In this case, the boundary position information of the video communication window is obtained while the central position information of the video communication window is not needed to be obtained.

Of course, in actual application, the position, and size of the first shared display area may be determined in other ways. For example, no matter how the position and size of the video communication window is, the first shared display area is displayed in full screen.

For the transparency of the first part, in this example, it can be the first transparency which enables the first user to view the video frame in the first video communication window through the first shared display area. For example, the first user fails to view the video frame covered by the first part when the transparency of the first part is 0 and the first part covers the first video communication window; the video frame viewed by the user by looking through the first part is completely the same as that directly viewed by the user in the first video communication window when the transparency of the first part is 100%; and the greater the transparency is, the clearer the video frame viewed by the first user is when the transparency of the first part ranges from 0 to 100%.

In the process of displaying the first shared display area on the first display unit, i.e., in the process of performing step S404, when the second electronic device enables the shared screen, the first part of the second shared display area possessed by the shared screen on the second electronic device is overlappedly displayed on the second part of the second video communication window on the second electronic device, so that the second electronic device can synchronously display in the second shared display area the object displayed in the first shared display area. The position relationship between the second shared display area and the second video communication window is similar to the position relationship between the first shared display area and the first video communication window, and thus details omitted herein.

It can be known from the above description that the shared screen in this example enables the two parties of the video communication to synchronously view the object displayed on the shared screen, to realize synchronously sharing the discussed content in the process of the video communication.

In a further example, when or after step S402 is performed, the first electronic device further sends notification information to the second electronic device to notify the second electronic device to enable the shared screen. In particular, the first electronic device can send the notification information through a server (for example, the instant communication server 10 as described above) or directly send the notification information to the second electronic device. The second electronic device enables the shared screen based on the notification information when the second electronic device receives the notification information.

In this example, step S403 particularly comprises during a predetermined period of time after the notification information is sent, if response information sent from the second electronic device is received, then the shared screen is enabled in response to the start-up instruction; or, during a predetermined period of time after the notification information is sent, if response information sent from the second electronic device is not received, then the shared screen is enabled in response to the start-up instruction. In the first case, during the predetermined period of time after the notification information is sent, only if response information sent from the second electronic device is received, the shared screen can be enabled; however, in the second case, even if response information sent from the second electronic device is not received during the predetermined period of time, the shared screen is still enabled. For the second electronic device, the shared screen can be enabled according to the shared data when the shared data of the first electronic device is received.

Figure 6A:
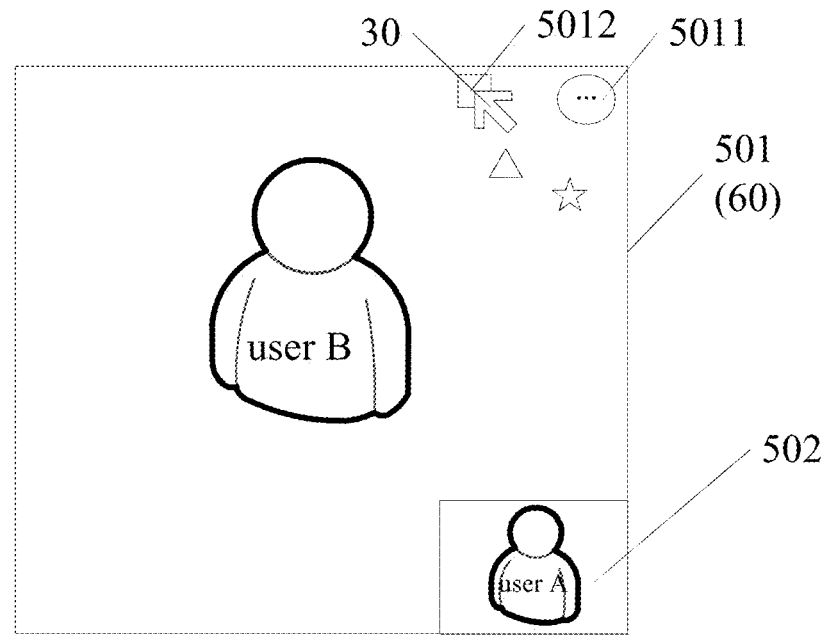
FIGS. 6a-6e are schematic diagrams illustrating a process decomposition of content sharing in an embodiment of the present disclosure.
Figure 6B:
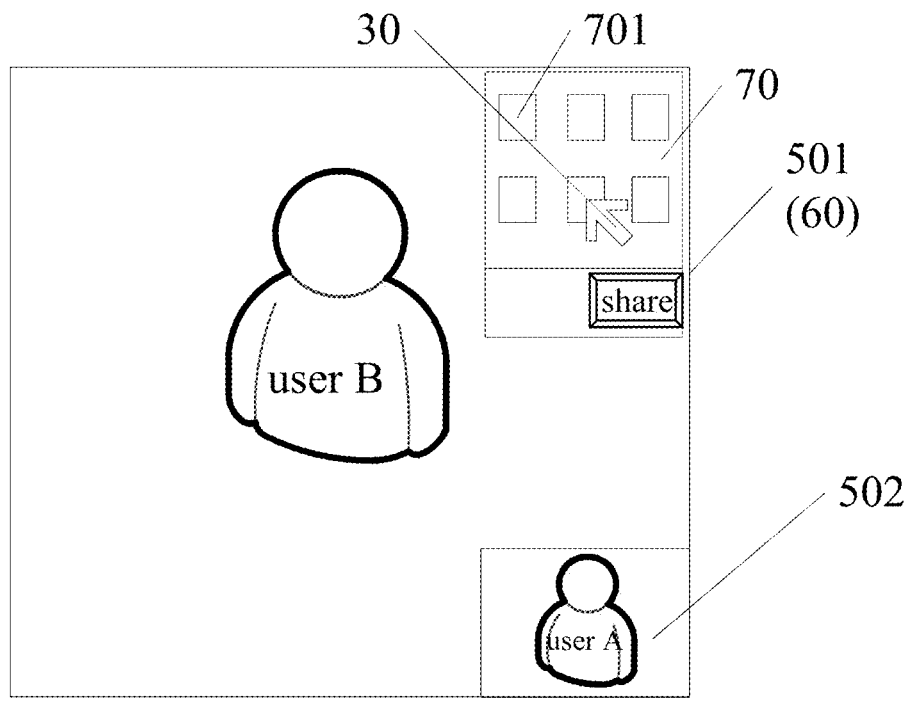
Figure 6C:
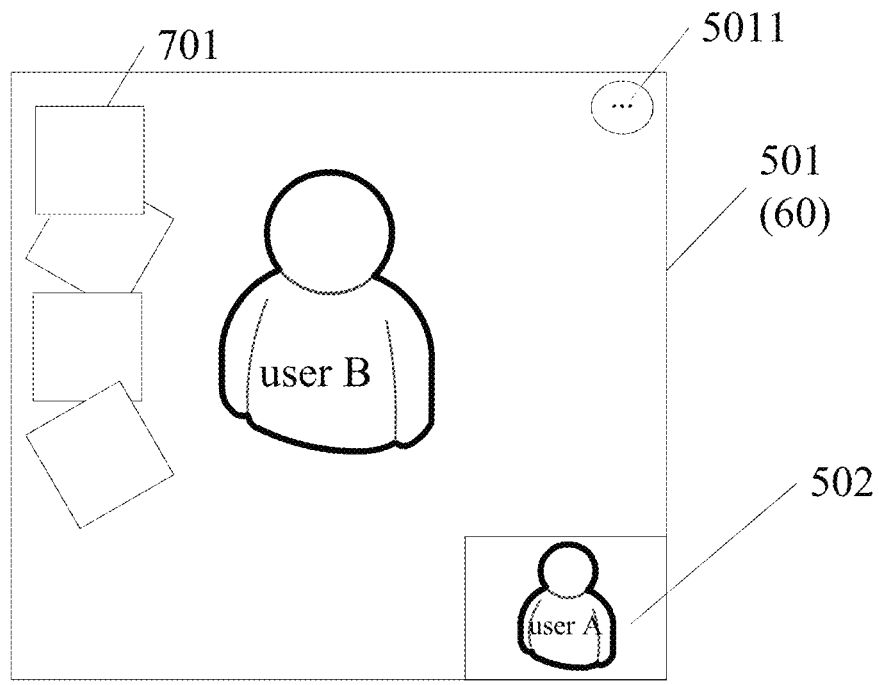

When the first electronic device has established a shared screen thereon, the content can be shared on the first electronic device. In particular, a sharing instruction can be firstly obtained. In a specific implementation process, obtaining a sharing instruction has two implementation forms. The first implementation form is that the user A triggers the sharing instruction on the first electronic device, that is, the user A initiatively shares; the second implementation form is that the user B initiatively shares, the sharing instruction is sent from the second electronic device, and is received by the first electronic device. Next, the implementation form of the case in which initiative sharing is performed on the first electronic device, and the sharing instruction is triggered on the first electronic device is introduced. By still taking the above second case as an example and at the same time please referring to FIG. 6a, given that the user A clicks an operation icon 5011, then a plurality of operation options will be displayed on the first display unit, wherein an operation option 5012 is an operation option for sharing a picture and other operation options are for example an option for sharing a screen and an option for sharing a game.

When the user A uses a mouse 30 to click or directly uses fingers to touch the operation option 5012, a picture selection interface 70 will be displayed on the first display unit (please referring to FIG. 6b) and the user A can use a mouse 30 or fingers or other selection tools to select a picture desired to be shared, and then the user A can click the "sharing" button. At this time, the first electronic device can obtain the sharing instruction, and the picture desired to be shared has been comprised in the sharing instruction, and thus the first electronic device performs step S302, and displays the picture on the first shared display area 60 based on the sharing instruction. Please referring to FIG. 6c for details, pictures 701 are scatteredly displayed in the left area of the first display unit. Of course, in other embodiments, the pictures 701 can also be displayed in other areas of the first shared display area 60, which can be set by the user through a setting interface. Of course, if the user A does not desire to continue sharing at this time, the user A may cancel the operation by clicking the "cancelling" button (not shown in the figure) or clicking other positions on the first display unit so as to cancel this operation.

In particular, when an object is displayed on the first shared display area 60, in order to make the object be displayed on the second display unit of the second electronic device, the first electronic device also sends the data corresponding to the display object through the server (for example, the instant communication server 10 as described above) or directly sends the data corresponding to the display object to the second electronic device based on the sharing instruction, when the second electronic device receives the data, it is equivalent that the second electronic device obtains the sharing instruction, and thus the second electronic device displays the received object on the second shared display area.

Figure 6D:
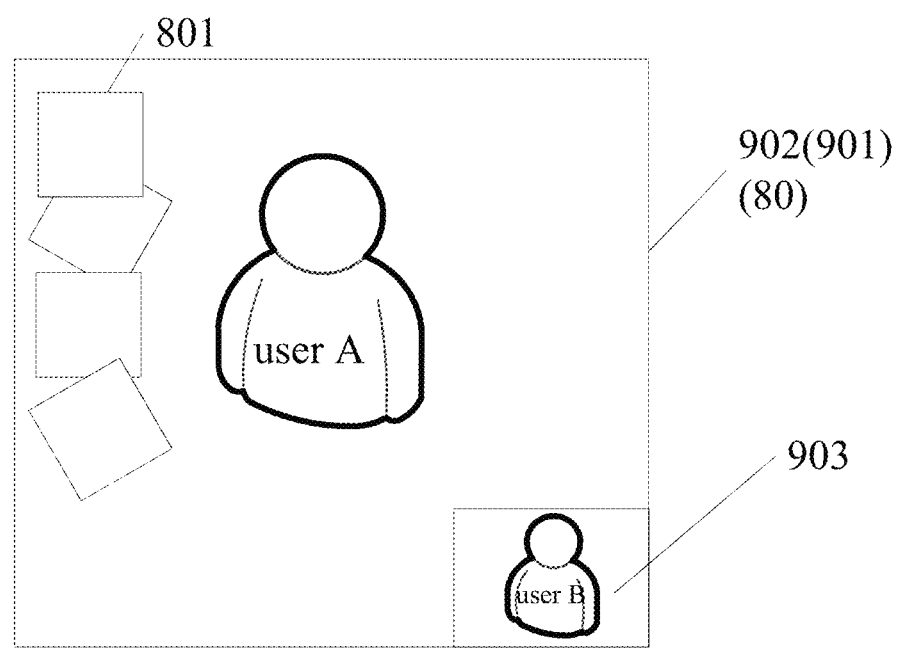

In particular, please referring to FIG. 6d, a second display unit 901 displays a video communication window 902 of the user A and a video communication window 903 of the user B. The second electronic device displays the display object, i.e., pictures 81, on a second shared display area 80, for example, scatteredly displaying the pictures 801 in the left area of the second display unit 901, and preferably not sheltering the video image of the user.

Figure 6E:
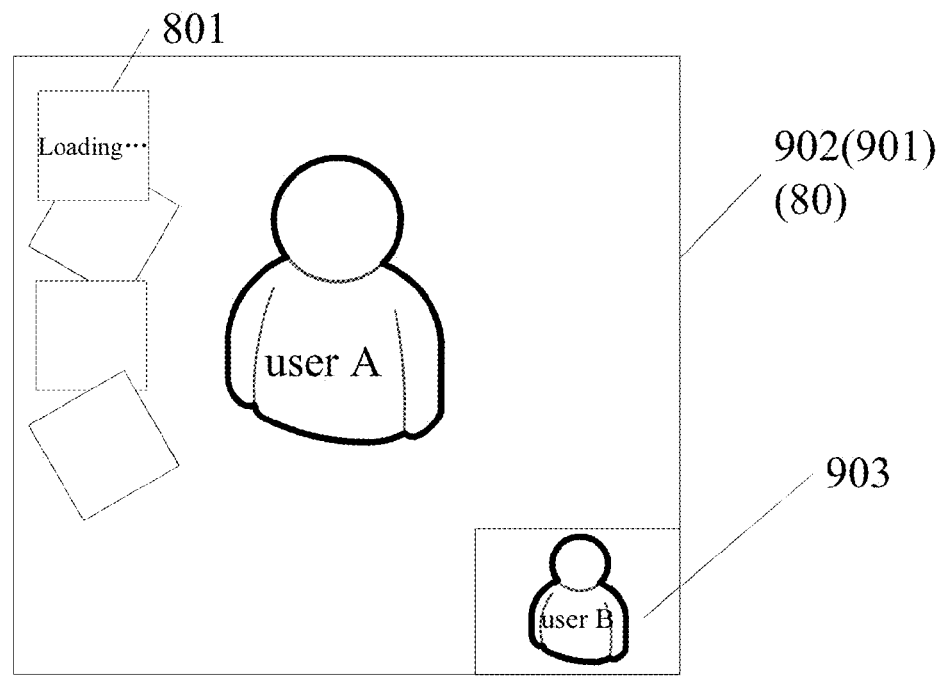

Further, when the first electronic device sends the data of the display object o the second electronic device, maybe not all the data can reach at the same time or maybe the network is not good, and therefore the profile of the picture can be displayed on the second shared display area 80, and prompt information is displayed to prompt the user B that the picture is in the process of being received, please referring to FIG. 6e for details.

For the second implementation form, that is, the sharing instruction is received from the second electronic device, then the processing of the first electronic device is still the step of obtaining the sharing instruction and displaying the object on the first shared display area based on the sharing instruction, which is the same as the processing of the first implementation form as described above, except that the object has been displayed on the second shared display area, and thus it is not needed to send the data of the object to the second electronic device.

For the process of sharing a screenshot and the process of sharing a game or the process of sharing other content, similar to the process of sharing pictures in the example as described above, except that for the process of sharing a screenshot, the process of selecting pictures described above is replaced with the process of getting a screenshot, and thus details omitted herein.

It can be seen from the above description that, given the user A corresponding to the first electronic device wants to share a picture with the user B corresponding to the second electronic device, the shared screen can be firstly enabled, then a sharing instruction is triggered, and then the picture will be displayed on the first shared display area. The picture displayed on the first shared display area can also be displayed on the second shared display area of the second electronic device, then the user B can also view the picture, and thus the users A and B can discuss the picture, so as to synchronously share the discussed content in the process of the video communication. Compared with sharing through a message window conventionally, this information processing method has a better synchronization, a more humanized interface, a more convenient operation, and a better user experience.

Second Embodiment

Below will be a description of the second embodiment by referring to FIGS. 7-12.

Figure 7:
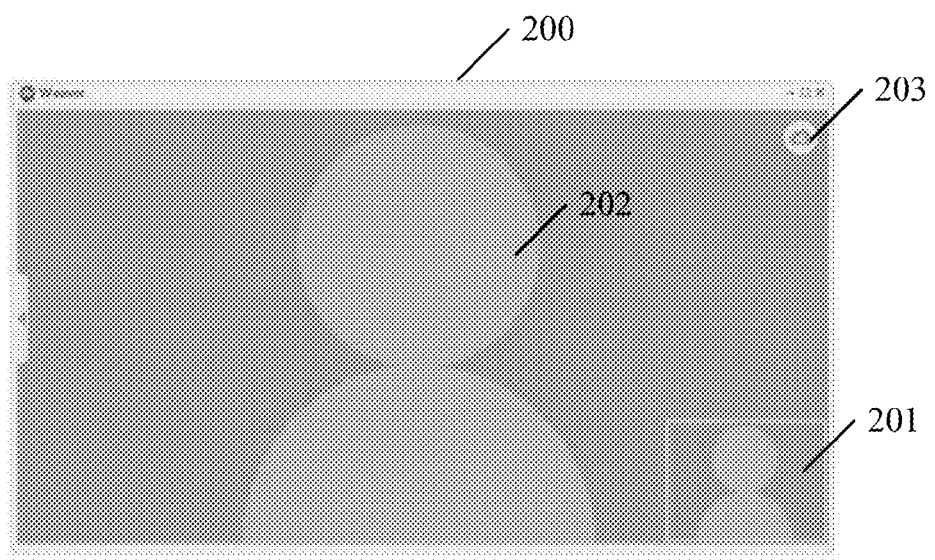
FIG. 7 is a schematic diagram illustrating a display on an electronic device applying an information processing method according to an embodiment of the present disclosure.

First, referring to FIG. 7, FIG. 7 shows a displayed first communication interface 200 when a communication link is established between the first electronic device and the second electronic device. The first communication interface 200 comprises a second subarea 201 used for displaying first information (for example, an image of the first user) acquired by the first electronic device and a first subarea 202 used for displaying second information (for example, an image of the second user) acquired by the second electronic device. In addition, the first communication interface 200 can also comprise a prompt identification 203 used for the first user to start up sharing.

At this time, the information processing method for example judges whether the first user triggers the prompt identification 203. In particular, in a case that the first electronic device comprises a touch screen, the information processing method for example judges whether an operation body (for example, fingers of the user) touches or clicks the prompt identification 203.

The information processing method displays the second communication interface, in particular, for example displaying the shared screen, when it is judged that the first user triggers the prompt identification 203 and the prompt identification 203 is in particular for example the "turning-on shared screen" button.

Figure 8:
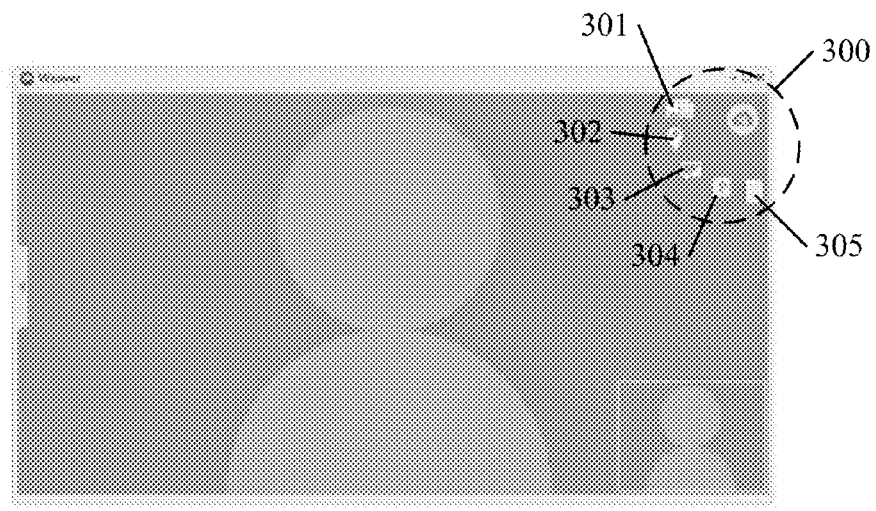
FIG. 8 is a schematic diagram illustrating a display on an electronic device applying an information processing method according to an embodiment of the present disclosure.

Alternatively, the information processing method displays a shared identification set when it is judges that the first user triggers the prompt identification 203 and the prompt identification 203 comprises in particular for example the shared identification set, as shown by 300 in FIG. 8. The shared identification set 300 comprises at least one shared identification, in this example, for example, comprising five shared identifications 301-305.

Next, the information processing method judges whether the first user triggers any shared identification in the shared identification set 300.

Figure 9:
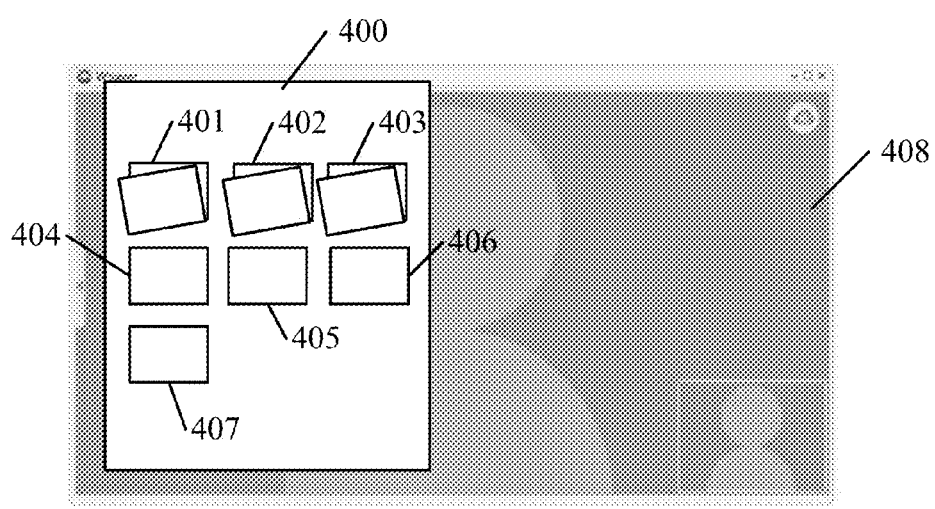
FIG. 9 is a schematic diagram illustrating a display on an electronic device applying an information processing method according to an embodiment of the present disclosure.
Figure 10:
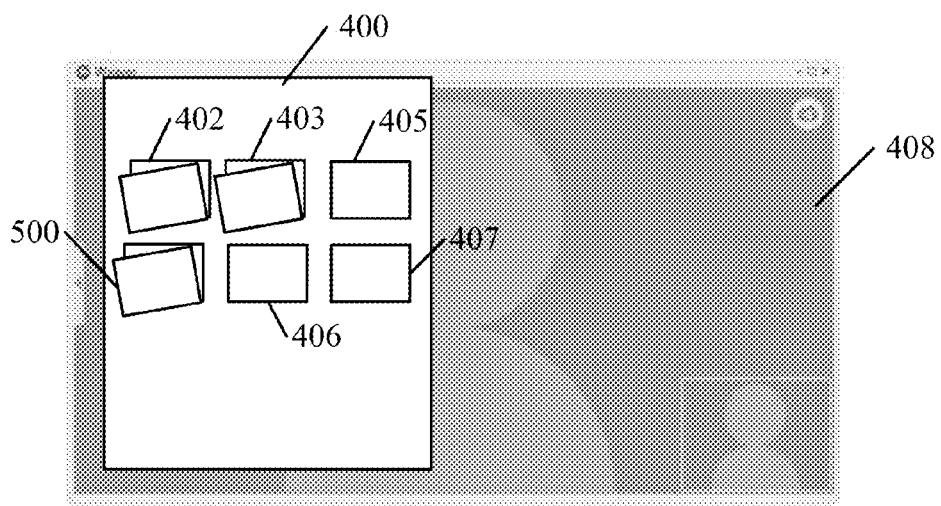
FIG. 10 is a schematic diagram illustrating a display on an electronic device applying an information processing method according to an embodiment of the present disclosure.
Figure 11:
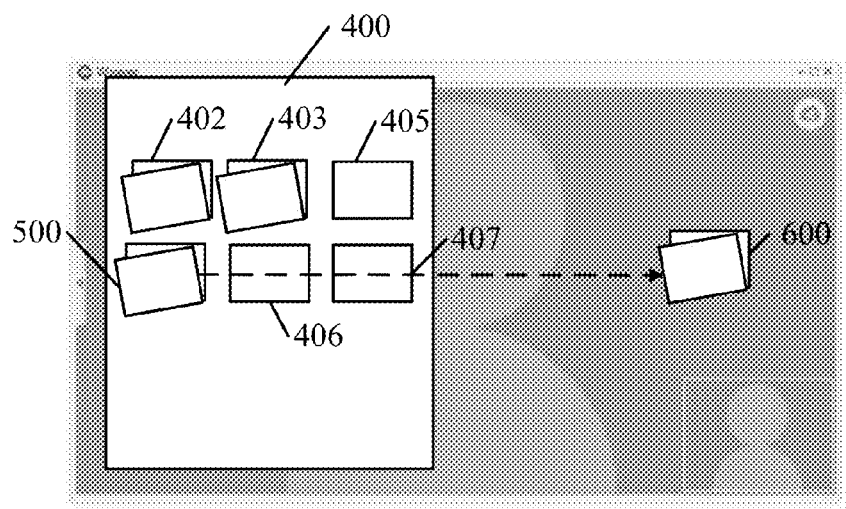
FIG. 11 is a schematic diagram illustrating a display on an electronic device applying an information processing method according to an embodiment of the present disclosure.

In particular, as a first example, the information processing method determines to share pictures, and displays for example a first operation interface 400 as shown in FIG. 9, when it is judged that the shared identification 301 in the shared identification set 300 is triggered. The first operation interface comprises a plurality of candidate information 401-407. The candidate information may be either an image (for example 404-407) or an image file folder (for example 401-403).

Next, the information processing method judges whether shared information is determined from the plurality of candidate information. In particular, the information processing method detects a predetermined operation for at least first candidate information and second candidate information of the plurality of candidate information, and determines the first candidate information and the second candidate information as the shared information in response to the predetermined operation.

For example, the information processing method detects whether the first user selects (for example, checks) one or more of the plurality of candidate information 401-407 and determines the selection. For another example, the information processing method detects whether the first user drags one or more of the plurality of candidate information 401-407 to an area 408 outside the first operation interface.

In particular, as an example, the information processing method can display with different display effects after determining from the plurality of candidate information the first candidate information 401 used as the image file folder and the second candidate information 404 used as the image file as the shared information. For example, the information processing method can display the shared information with effects of highlighting, enlarging, and the like, so as to make it convenient for the user to identify.

In addition, the information processing method can further update the first operation interface from an initial first state into a second state. The distance between the first candidate information and the second candidate information in the second state is smaller than the distance in the first state. In other words, from the user's perspective, the information processing method displays the first candidate information 401 and the second candidate information 404 with an effect similar to stacking, for example, as shown by 500 in FIG. 10. Later, the information processing method receives the sharing operation for the shared information, for example, an operation of dragging (as show in dotted arrow in FIG. 11) the stacked shared information 500 to a position in the area 408 outside the first operation interface (as shown by 600 in FIG. 11).

Figure 12:
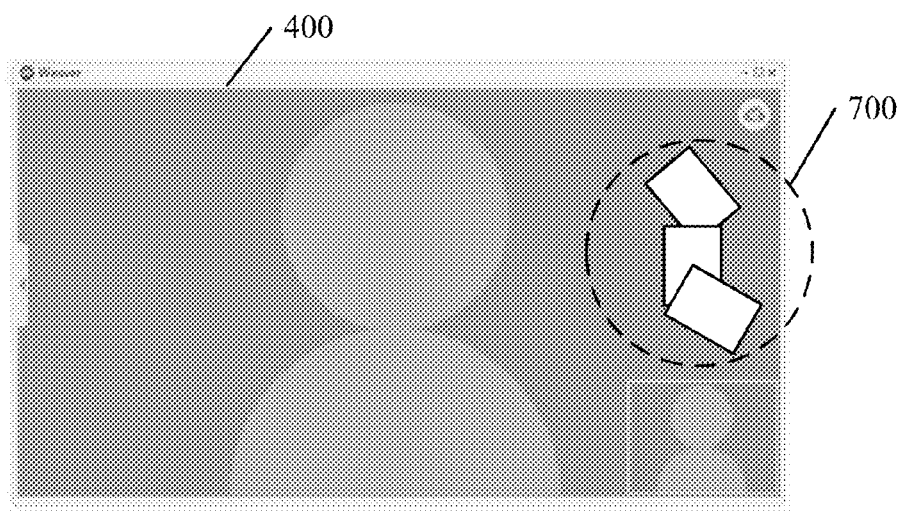
FIG. 12 is a schematic diagram illustrating a display on an electronic device applying an information processing method according to an embodiment of the present disclosure.

Thus, on one hand, the information processing method responds to the sharing operation and displays a second communication interface as shown in FIG. 12. The second communication interface is generated by comprising the second area in the first area. For example, in an example of FIG. 12, in the second communication interface, except for the first communication interface, the shared information 401 and 404 are superimposedly displayed. It is needed to point out that as shown in FIG. 12, after sharing is realized, the shared information 401 and 404 can change from pictures originally displayed with an effect of stacking to pictures displayed with an effect of scattering, for example, as shown by 700 in FIG. 12.

In addition, on the other hand, the information processing method sends the shared information to the second electronic device. The second electronic device can display the second communication interface in the same way in response to the received shared information.

Thus, in this scene of picture sharing, the information processing method enables the first user at the first electronic device side to share the two different types of shared information of the image 404 and the image file folder 401 with the second user at the second electronic device side.

It is needed to point out that the above is a description by taking picture sharing as an example, but those skilled in the art can understand that the information processing method of the embodiment of the present disclosure is also applicable to other types of information sharing such as audio sharing and video sharing and the like.

In addition, it is further needed to point out that the above is a description by taking common sharing of the two different types of information of the image and the image file folder as an example, but those skilled in the art can understand that the information processing method of the embodiment of the present disclosure is also applicable to the common sharing of different types of information such as the common sharing of image and audio information, the common sharing of the image and the audio file folder and the like.

In addition, it is further needed to point out that the above is a description by taking the case of the second area being comprised in the first area (being mutually superimposed) as an example, but those skilled in the art can understand that the second area is not limited to being disposed in the first area.

For example, the information processing method can further generate the second communication interface by setting the first information acquired by the first electronic device in the second subarea, setting the second information acquired by the second electronic device in the first subarea and setting the second area not comprising any shared information when the judgment result indicates that the predetermined condition is satisfied.

In other words, the display processing method presets a null second area or a second area only displaying a default background image. Later, the information processing method displays the corresponding determined shared information in the second communication interface when the information processing method judges that the dragging operation of dragging at least one of the plurality of candidate information from the first operation interface to the second area is received, or when the information processing method judges that the operation of selecting at least one of the plurality of candidate information and determining the selection is received.

To sum up, in the above first example, the first user at the first electronic device side can utilize the communication interface to realize information sharing with the second user while performing communication through a very simple operation in the process of being in video communication with the second user at the second electronic device side, so as to greatly enriching the user's experience.

In addition, in the scene of picture sharing, in a case that the first electronic device and the second electronic device have realized picture sharing, further, the first electronic device and the second electronic device can further realize sharing the operation to the shared picture, that is, realizing (quasi-) synchronous update of the shared information.

In particular, in a case of the communication interface as shown in FIG. 12, for example, when the first electronic device detects an operation of the first user dragging one of the pictures, the information processing method moves the display position of the picture in response to the operation. At the same time, the information processing method sends the information of the operation to the second electronic device, so that the picture displayed on the second electronic device performs the same moving.

It is needed to point out that the above is the description by taking the dragging operation, as an example, but those skilled in the art can understand that the information processing method of the embodiment of the present disclosure can also be applicable to the synchronous update of operations such as enlarging, reducing, switching and rotating and the like.

In addition, the above is the description by taking the picture file as an example, but those skilled in the art can understand that the information processing method of the embodiment of the present disclosure can also be applicable to the synchronous update of operations such as fast forwarding, pausing and back warding and the like of the audio and video file.

Thus, the information processing method of the embodiment of the present disclosure not only can realize information sharing in the video communication process between the first user and the second user, but also can realize the two parties' sharing on the operation to the shared information, i.e., the synchronous update of the shared information, so that the interaction between users being in a long distance communication with each other will be more smooth and natural, thus sensuously closing the distance between the two parties and improving the user's experience.

In addition, in the above embodiment, the first user at the first electronic device side shares the content locally stored in the first electronic device with the second user at the second electronic device side.

Alternatively, the first user can share the remotely stored content with the second user at the second electronic device side.

In this embodiment, by returning to the interface as shown in FIG. 8, the information processing method firstly displays the interface that prompts the user to select a remote or local picture (not shown in the figure) when it is judged that the user triggers the shared identification 301 as described above. The information processing method performs the operations by referring to FIGS. 9-12 as described above when it is detected that the user selects to select a local picture. The information processing method displays the second operation interface and performs the following operation when it is detected that the user selects to select a remote picture.

Of course, those skilled in the art can understand that the interface as shown in FIG. 8 may also comprise a single shared identification used for sharing the remote information (not shown in the figure). The information processing method displays the second operation interface and performs the following operation when it is judged that the user triggers the shared identification in the shared identification set corresponding to the remote information sharing.

In particular, the second operation interface can for example comprise a log-in prompt information used for logging in a remote third electronic device (for example, a remote server). The information processing method receives input information for the second operation interface, such as account number, password, and the like. Thus, the information processing method obtains the shared information from the third electronic device based on the input information for the second operation interface.

Thus, in the embodiment, the information processing method can access the remote device and directly share the information on the remote device with the second electronic device while the first user and the second user are in video communication, without firstly downloading the information from the remote device and then sharing, thus simplifying the user's operation and improving the user's experience.

As a second example, the information processing method determines to share a map when it is judged that a shared identification 302 in the shared identification set 300 is triggered, so as to display the second communication interface. The second communication interface comprises the second subarea used for displaying the image at the first electronic device side, the first subarea used for displaying the image at the second electronic device side and the second area used for displaying the map information. The map can for example comprise the positions of the user at the first electronic device side and the user at the second electronic device side. In addition, being the same as the above first example, the information processing method can perform operations such as enlarging, translation and the like on the displayed shared map in response to the operation of the first user and/or the second user, or display a specific route on the displayed map in response to the input operation of the first user and/or the second user, and send the above operation information to the electronic device of the opposite party to be updated, so that the map displayed at the two parties are always consistent with each other.

As a third example, the information processing method determines to share a topic when it is judged that a shared identification 303 in the shared identification set 300 is triggered. Being similar to the case in the above first example, the information processing method can display the first operation interface. The first operation interface can for example comprise a plurality of hot topics on the websites relevant to the network communication to be used for the first user to select therefrom a topic to be shared. Thus, the information processing method sends the topic selected by the first user and relevant webpage information to the second electronic device and calls the corresponding webpage browsing program on the second electronic device to open the topic.

As a fourth example, the information processing method determines to share a PPT when it is judged that a shared identification 304 in the shared identification set 304 is triggered. Being similar to the case in the above first example, the information processing method can display the first operation interface to be used for the first user to select therefrom a PPT to be shared. Thus, the information processing method sends the PPT selected by the first user to the second electronic device and calls the corresponding program on the second electronic device to open the PPT.

Thus, being the same as the first example, the information processing method can receive the operation such as switching the PPT performed by the first user and/or the second user, and send the operation information to the electronic device of the opposite party to be updated, so that the PPT displayed at the two parties is consistent with each other.

As a fifth example, the information processing method determines to share a specific audio (in the present application, being referred to as "bedtime story") when it is judged that a shared identification 305 in the shared identification set 304 is triggered. Thus, being similar to the case in the above first example, the information processing method displays an operation interface to be used for the first user at the first electronic device side to select a local or remote book to be read. Thus, the information processing method sends the book selected by the first user to the second electronic device, and calls a corresponding program on the second electronic device to open the book. In addition, being the same as the first example, the information processing method can receive the operation of page turning performed by the first user and/or the second user, and send the operation information to the electronic device of the opposite party to be updated, so that the page displayed at the two parties is consistent with each other.

Being different from the first to fourth examples, in the above examples, the shared information displayed on the first electronic device and the second electronic device are completely the same; in this fifth example, the shared information displayed on the first electronic device and the second electronic device may be partially the same. For example, the information processing method can display a storybook including images and captions at the first electronic device side, so as to be read aloud by the first user at the first electronic device side (for example, parents). On the other hand, the story book displayed at the second electronic device side may only comprise images but not comprise captions, so as to be viewed by the second user at the second electronic device side (for example, children).

In addition, in this example, with sharing of the story book (images in the story book), the information processing method further can output audio such as a background music at the first electronic device side and the second electronic device side, so as to realize sharing of the audio information.

In addition, in this example, when the second communication interface is displayed, in order to utilize the display area as much as possible to present an electronic book with a larger size, the information processing method can hide the second subarea used for displaying the image at the first electronic device side and/or the first subarea used for displaying the image at the second electronic device side.

That is, in this example, the information processing method generates and displays the third communication interface only based on the second area or based on the second area and one of the first subarea and the second subarea when it is judged that the shared identification in the shared identification set is triggered.

Thus, in this embodiment, the information processing method can hide the video communication window while the communication between the first electronic device and the second electronic device is kept to be not turned off, so as to utilize the effective display area as much as possible to display the shared information, which thus makes it convenient for the user to view the shared information, thus improving the user's experience.

As seen from the above four examples, the information processing method of the embodiment of the present disclosure can commonly share a plurality of types of information. The plurality of types not only mean a single object (such as a single picture) and an object set (such as a picture file folder), but also means different formats of information, for example, webpage information, picture information and PPT information and the like.

It is needed to point out that, in the information processing method of the embodiment of the present disclosure, the second electronic device being used as a receiving terminal can identify the type of the shared information and automatically calls the corresponding program module to output the shared information when different types of information are shared, so that the second user at the receiving terminal does not need to manually select an appropriate program to open the shared information after receiving the shared information, so as to simplify the user's operation.

In addition, it is needed to point that the types of the shared identification of the four examples as described above are just for illustration. Those skilled in the art can design sharing of more or less types on such a basis to realize the corresponding function.

Third Embodiment

Figure 13A:
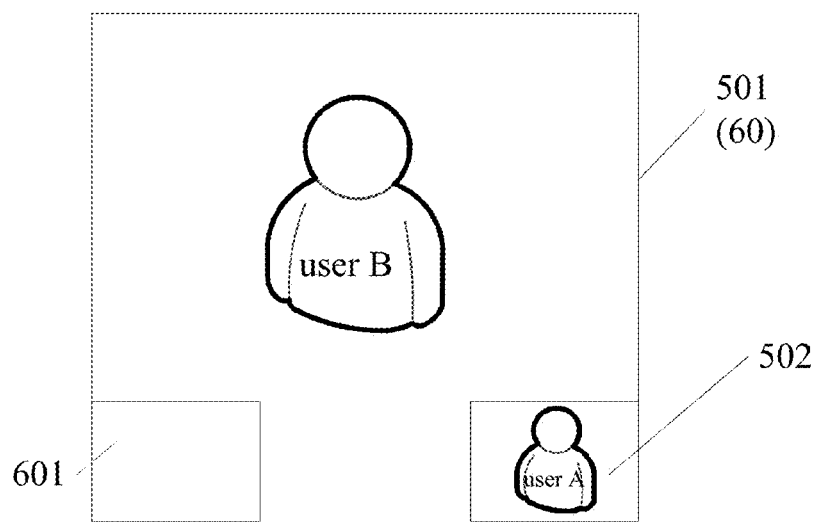
FIGS. 13a-13b are schematic diagrams illustrating a division of a private area and a public area in an embodiment of the present disclosure.
Figure 13B:
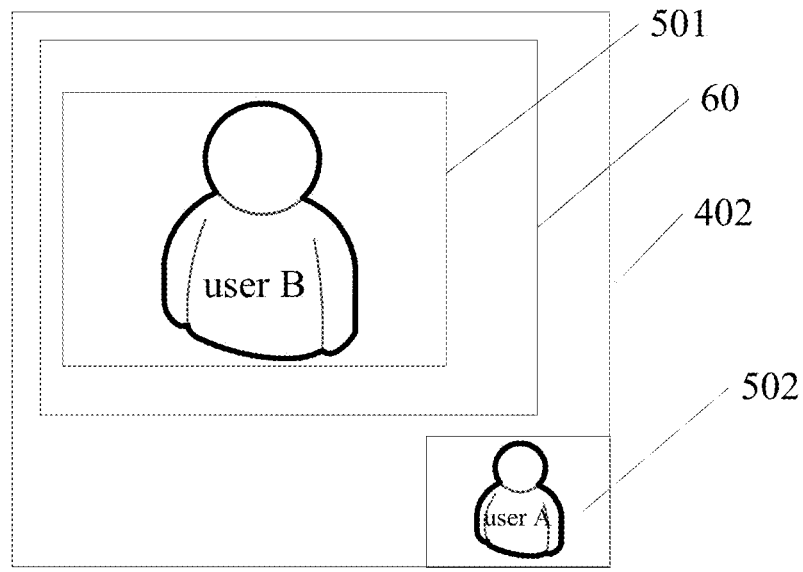
Figure 14A:
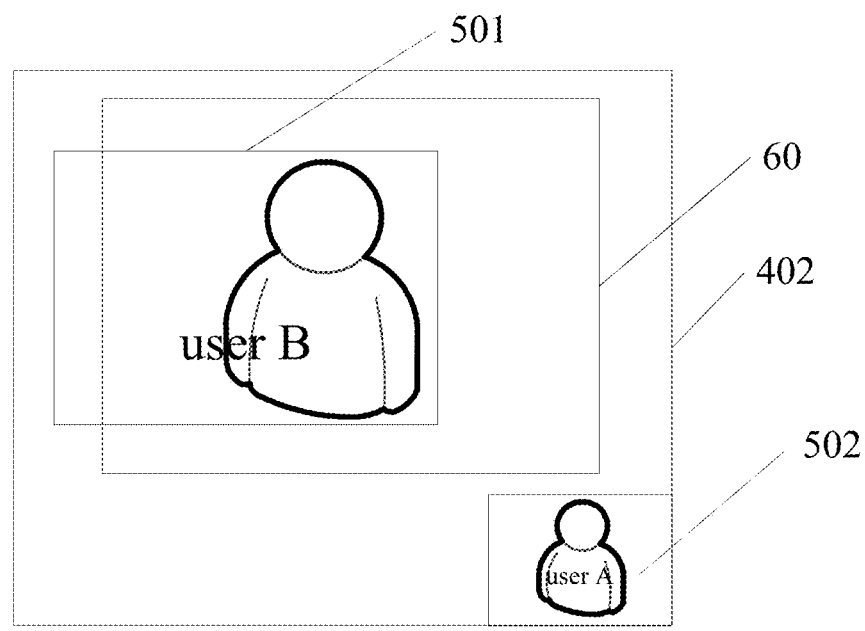
FIGS. 14a-14b are schematic diagrams illustrating a position relationship between a video communication window and a shared screen when they are moved in an embodiment of the present disclosure.
Figure 14B:
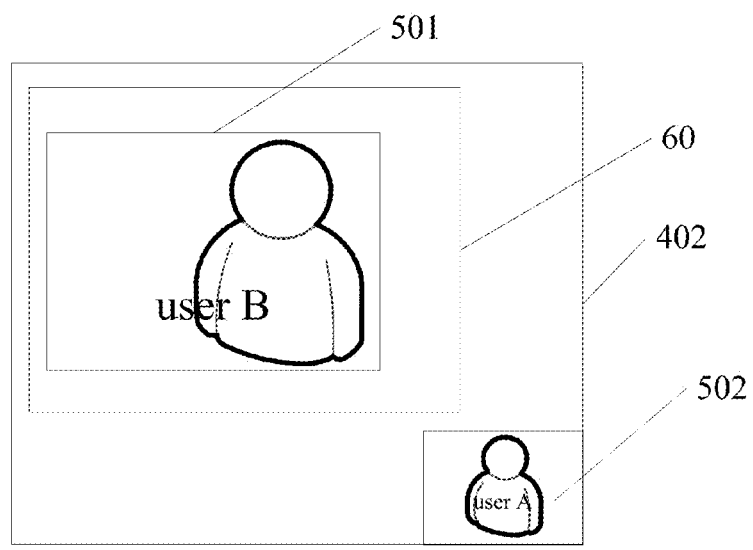

Below will be a description of the third embodiment by referring to FIGS. 13-14.

In order to protect privacy of the user and make it convenient for the user to use, the first shared display area particularly comprises a private area and a public area. Only the display object displayed in the public area can be shared with the opposite party while the display object displayed in the private area will not be shared with the opposite party, and thus the opposite party cannot view this part of display object, so as to protect the privacy of the user.

In particular, a second object cannot be displayed on the second shared display area when being displayed in the private area; a third object can be synchronously displayed on the second shared display area when being displayed in the public area.

When a first operation for the second object is received, the second object is operated in response to the first operation; when a second operation for the third object is received, the third object is operated in response to the second operation and the information of the second operation is sent to the second electronic device, so that the second electronic device displays the second operation and operates the third object displayed on the second shared display area based on the second operation. For example, the first user performs an operation of enlarging on the third object, and then the first electronic device will perform the operation and enlarges the third object, and sends the operation information to the second electronic device. Then, the second electronic device displays the operation of enlarging the third object on the second shared display area, and enlarges the third object on the second shared display area based on the second operation.

As for a division of the public area and the private area, in actual application, there are a plurality of implementation modes, which will be respectively specified by taking examples, In a first implementation mode, the public area and the private area are absolutely fixed. In particular, for example, as shown in FIG. 13a, a first area 601 on a first shared display area 60 is a private area while other areas are public areas. In this example, the private area 601 is located at the lower left corner of the first shared display area 60, but in other examples, the private area 601 can be further located at other positions, for example, being located at the upper left corner of the first shared display area 60.

In a second implementation mode, the public area and the private area are relatively fixed, in particular, for example, as shown in FIG. 5a. Wherein "fixed" reflects in that the public area is in particular an area being completely overlapped with the video communication window 501 while other areas are private areas, and "relatively" reflects in that the specific positions of the public area and the private area are decided by the position of the video communication window 501, and thus as the position of the video communication window 501 changes, the public area and the private area will also change. For example, as shown in FIG. 13b, the position of the video communication window 501 in FIG. 13b is obtained by moving the video communication window 501 in FIG. 5a to the left. Compared with FIG. 5a, in FIG. 13b, a part of area at the left of the first shared display area 60 being originally the private area is changed into the public area while a part of area at the right of the first shared display area 60 being originally the public area is changed into the private area.

Further, if the video communication window 501 is enlarged or displayed in full screen to occupy all the effective display area of the first display unit, then the size of the first shared display area is the same with that of the video communication window 501. In this case, all the private area is changed into the public area, which is a special situation in this implementation mode.

Therefore, the public area and the private area are determined according to the following steps: determining a first position of the video communication window on the first display unit, and dividing the shared screen into the public area and the private area based on the first position.

Wherein the first position is for example a boundary position of the video communication window, or may be a central position of the video communication position, and of course may be other positions, to which the present application does not limit.

In actual application, except for the situations in FIGS. 13a and 13b as described above, the private area is in particular for example at the lower left corner on the shared screen, when the video communication window is moved to the area corresponding to the lower left corner of the shared screen, the upper right corner of the shared screen is determined as the private area according to the first position of the video communication window, i.e., the position contrary to the moving direction of the video communication window.

In the above implementation modes and other cases of the private area and the public area, in particular, for example, whether there is a display object moved from the private area to the public area is detected, and if there is a display object moved from the private area to the public area, then a sharing instruction is obtained, and the display object is displayed on the public area to be shared. Similarly, if the user does not want to continue sharing the display object, the display object can be dragged from the public area to the private area, and thus sharing is cancelled.

When the video communication window and the shared screen are displayed on the first display unit, in order to facilitate the operation, the embodiment of the present disclosure allows the video communication window and the shared screen to be moved, for example, if the user feels that the position of the current video communication window is inconvenient to be viewed, then the user can move the video communication window to a position as needed by the user.

Therefore, in order to guarantee the shared screen to completely overlap the video communication window, in the present embodiment, the shared screen is moved when the video communication window is moved to a position being not completely overlapped with the shared screen, so that the shared screen is completely overlapped with the video communication window. In particular, please referring to FIG. 14a, on the basis of FIG. 13b, the video communication window 501 moves to the left, thus going beyond the coverage area of the shared screen, then the first shared display area 60 is moved when the first electronic device detects that the video communication window 501 goes beyond the coverage area of the shared screen, such that the first shared display area 60 is completely overlapped with the video communication window 501 as shown in FIG. 13b.

Similarly, the video communication window is also synchronously moved when the user moves the shared screen to enable the shared screen not to be completely overlapped with the video communication window, such that the shared screen is completely overlapped with the video communication window.

On the other hand, when the video communication window or the shared screen is moved, if the case that the shared screen cannot be completely overlapped with the video communication window does not appear, except for the case that the private area and the public area can be changed as described above, when the video communication window or the shared screen is moved, the other one can be also moved or cannot be moved, and the relative position can be guaranteed to not be changed if the other one is also moved.

In addition, it is needed to point out that the above is the description by taking the case of performing information sharing at the same time when the video communication is performed as an example. Those skilled in the art can understand that the information processing method of the embodiment of the present disclosure can also be applicable to communication such as text communication and audio communication and the like.

The above are the description of the information processing method of the embodiment of the present disclosure by referring to FIGS. 3-14. The information processing method of the embodiment of the present disclosure can realize information sharing and real-time and (quasi-) synchronous updating of the shared information displayed by the two parties by using the communication window at the same time when the first electronic device and the second electronic device are in communication with each other, thus extending functions that can be realized by the communication, increasing interaction between the users of the two parties of communication, and enriching the user's experience.

Below will be a description of the information processing apparatus of the embodiment of the present disclosure by referring to FIG. 15.

The information processing apparatus of the embodiment of the present disclosure is applicable to an electronic device. The electronic device is such as a mobile phone, a panel personal computer, a personal computer, and the like. The electronic device possesses a communication unit used for communicating with other electronic devices. The electronic device may further possess an audio acquisition unit such as a microphone and a video acquisition unit such as a camera used for acquiring input information. In addition, the electronic device may further possess an audio output unit such as a loudspeaker and a video output unit such a display used for outputting corresponding information. In the below description, the electronic device is referred to as a first electronic device and an electronic device communicating with the electronic device is referred to as a second electronic device when appropriate. Below will be a description by taking the information processing apparatus of the embodiment of the present disclosure being applicable to the first electronic device as an example. The first electronic device comprises a first display unit and a communication unit, and can communicate with the second electronic device through the communication unit.

Figure 15:
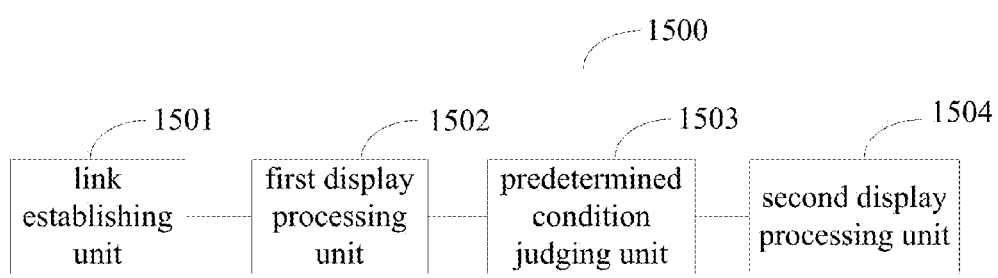
FIG. 15 is a block diagram illustrating major configurations of an information processing apparatus according to an embodiment of the present disclosure.

In particular, as shown in FIG. 15, the information processing apparatus 1500 of the embodiment of the present disclosure comprises a link establishing unit 1501, a first display processing unit 1502 and a predetermined condition judging unit 1503 and a second display processing unit 1504.

The link establishing unit 1501 establishes a communication link between the first electronic device and the second electronic device. The first display processing unit 1502 displays a first communication interface used for communicating with the second electronic device on the first display unit. The predetermined condition judging unit 1503 judges whether a predetermined condition is satisfied and obtains a judgment result. The second display processing unit 1504 displays a second communication interface used for communicating with the second electronic device on the first display unit when the judgment result indicates that the predetermined condition is satisfied.

The second communication interface comprises a first area and a second area, the first area and the second area are at least partially overlapped, and the first area comprises a first subarea and/or a second subarea, the second subarea is used for displaying first information acquired by the first electronic device, the first subarea is used for displaying second information acquired by the second electronic device, the second area is used for displaying shared information, and at least a part of the shared information is simultaneously displayed on the first electronic device and the second electronic device.

In an embodiment, in the information processing apparatus, the first electronic device is in video communication with the second electronic device through the communication unit, the first communication interface comprises a first video communication window used for displaying a video frame acquired by and transmitted from the second electronic device; the predetermined condition is that a sharing start-up instruction has been obtained.

The information processing apparatus further comprises a start-up instruction obtaining unit (not shown in the figures) used for obtaining a sharing start-up instruction, the sharing start-up instruction being used for starting up a shared screen. The first area of the second communication interface comprises the first video communication window and the second area of the second communication interface comprises the shared screen, and the shared screen possesses a first shared display area.

In an embodiment, in the information processing apparatus, the first shared display area is displayed on the first display unit; wherein a first part of the first shared display area is at least overlapped with a second part of the first video communication window; transparency of the first part is a first transparency, so that a first user of the first electronic device is able to view the video frame in the first video communication window through the first shared display area; wherein in a process of displaying the first shared display area on the first display unit, when the second electronic device enables the shared screen, a first part of a second shared display area possessed by the shared screen on the second electronic device is overlappedly displayed on a second part of a second video communication window on the second electronic device, so that the second electronic device is able to synchronously display in the second shared display area an object displayed in the first shared display area.

In an embodiment, the information processing apparatus 1500 further comprises a first operation receiving unit, a first operation instruction generating unit, an updating unit and a first operation instruction sending unit (not shown in the figure). The first operation receiving unit receives a first operation at the first electronic device side. The first operation instruction generating unit generates a first operation instruction according to the first operation. The updating unit updates the shared information displayed in the second area according to the first operating instruction. The first operation instruction sending unit sends the first operation instruction to the second electronic device. The second electronic device updates the at least part of the shared information displayed on the second electronic device according to the first operating instruction.

In another embodiment, the information processing apparatus further comprises a second operation instruction receiving unit. The second operation instruction receiving unit receives a second operation instruction from the second electronic device. The updating unit updates the shared information displayed in the second area according to the second operation instruction. The second operation instruction is generated by the second electronic device receiving a second operation at the second electronic device side.

In another embodiment, the first area comprises a prompt identification, and the first communication interface comprises the first area. The predetermined condition judging unit comprises one of the following: a prompt triggering judging unit for judging whether the prompt identification is triggered, or a shared information receiving judging unit for judging whether the shared information is received from the second electronic device.

In another embodiment, in a case that the predetermined condition judging unit comprises the prompt triggering judging unit, the predetermined condition judging unit further comprises a shared identification display processing unit for displaying a shared identification set when it is judged that the prompt identification is triggered, the shared identification set comprising at least one shared identification; and a shared identification judging unit for judging whether a shared identification in the shared identification set is triggered.

In another embodiment, the information processing apparatus further comprises a first operation interface displaying unit for displaying a first operation interface when it is judged that a first shared identification in the shared identification set is triggered, the first operation interface comprising a plurality of candidate information; a shared information determining unit for judging whether shared information is determined from the plurality of candidate information; a sharing operation receiving unit for receiving a sharing operation for the shared information when it is judged that shared information is determined from the plurality of candidate information; and a shared information sending unit for sending the shared information to the second electronic device in response to the sharing operation.

In another embodiment, the shared information determining unit comprises a detecting unit for detecting a predetermined operation to at least a first candidate information and a second candidate information in the plurality of candidate information; and a determining unit for determining the first candidate information and the second candidate information as the shared information in response to the predetermined operation; wherein the first candidate information has a different type from the second candidate information.

In another embodiment, the sharing information determining unit further comprises a state updating unit for updating the first operation interface from an initial first state to a second state when the first candidate information and the second candidate information are determined from the plurality of candidate information as the shared information, a distance between the first candidate information and the second candidate information in the second state being less than that in the first state; a sharing operation receiving unit for receiving the sharing operating for the shared information; and a sending unit for sending the shared information to the second electronic device in response to the sharing operation.

In another embodiment, the prompt identification is a turning-on shared screen button on the first communication interface, the start-up instruction obtaining unit obtains the sharing start-up instruction when the turning-on shared screen button is triggered, the judgment result obtained from the predetermined condition judging unit indicates that the predetermined condition is satisfied. The second display processing unit comprises a setting unit for generating the second communication interface by setting first information acquired by the first electronic device in the second subarea, setting second information acquired by the second electronic device in the first subarea, and setting the second area not including any shared information when the judgment result indicates that the predetermined condition is satisfied.

In another embodiment, the shared information determining unit is configured to perform one of the following operations: judging whether the dragging operation of dragging at least one of the plurality of candidate information from the first operation interface to the second area is received, and judging whether the operation of selecting at least one of the plurality of candidate information and determining the selection is received.

In another embodiment, the information processing apparatus further comprises a second operation interface displaying unit for displaying a second operation interface when it is judged that a second shared identification in the shared identification set is triggered; an input information receiving unit for receiving input information for the second operation interface; and an obtaining unit for obtaining shared information from a third electronic device being different from the first electronic device and the second electronic device based on the input information for the second operation interface.

In another embodiment, the second communication interface comprises the shared identification set, and the information processing apparatus further comprises a third shared identification judging unit for judging whether a third shared identification in the shared identification set is triggered after the second communication interface is displayed; a third communication interface generating unit for generating a third communication interface only based on the second area or based on the second area and one of the first subarea and the second subarea when it is judged that a third shared identification in the shared identification ser is triggered; and a third display processing unit for displaying the third communication interface.

In another embodiment, the predetermined condition judging unit comprises a reception prompt identification displaying unit for displaying a reception prompt identification when it is judged that the shared information is received from the second electronic device; and a reception prompt identification judging unit for judging whether the reception prompt identification is triggered.

In another embodiment, the second display processing unit comprises a second communication interface generating unit for generating the second communication interface through including the second area in the first area, and a second communication interface displaying unit for displaying the generated second communication interface.

In an example, in the information processing apparatus, the start-up instruction obtaining unit detects whether there is a first object dragged to the first video communication window and generates the sharing start-up instruction when it is detected that there is a first object dragged to the first video communication window.

In an example, the information processing apparatus further comprises a sharing instruction obtaining unit. When or after the sharing start-up instruction is generated, the sharing instruction obtaining unit generates a sharing instruction, wherein the second display processing unit displays the first object on the first shared display area based on the sharing instruction.

In an example, in the information processing apparatus, a size of the first shared display area is larger than or equal to that of the first video communication window. In a case that the size of the first shared display area is equal to the size of the first video communication window, the first shared display area is completely overlapped with the first video communication window; in a case that the size of the first shared display area is larger than the size of the first video communication window, a first part of the first shared display area is completely overlapped with the first video communication window and is taken as a public area, the remaining part of the first shared display area is taken as a private area, and a second object cannot be displayed on the second shared display area when it is displayed on the private area; a third object can be synchronously displayed on the second shared display area when it is displayed on the public area.

In an example, in the information processing apparatus, the first operation instruction generating unit generates a first operation instruction in response to a first operation for the second object when the first operation receiving unit receives the first operation, and the updating unit operates the second object according to the first operation instruction; and the first operation instruction generating unit generates the first operation instruction in response to a second object for the third object when the first operation receiving unit receives the second operation, and the updating unit operates the third object according to the first operation instruction, and the first operation instruction sending unit sends the first operation instruction corresponding to the second operation to the second electronic device, so that the second electronic device displays the third object and operates the third object displayed on the second shared display area based on the second operation.

In an example, in the information processing apparatus, the second display processing unit displays the first object on the first shared display area based on the sharing instruction particularly comprises obtaining an ending position to which the first object is dragged; displaying the first object on an area corresponding to the ending position on the first shared display area.

In an example, the information processing apparatus further comprises a sending unit for sending notification information to the second electronic device after the start-up instruction obtaining unit obtains the sharing start-up instruction, so as to notify the second electronic device to enable the shared screen.

In an example, the information processing apparatus further comprises a response message receiving unit for receiving a response message for the notification information from the second electronic device; in a case that the response message receiving unit receives the response message sent from the second electronic device during a predetermined period of time after the sending unit sends the notification information, the second display processing unit starts up the shared screen; or in a case that the response message receiving unit does not receive the response message sent from the second electronic device during a predetermined period of time after the sending unit sends the notification information, the second display processing unit starts up the shared screen.

The above are the description of the information processing apparatus of the embodiment of the present disclosure by referring to FIG. 15. The information processing apparatus of the embodiment of the present disclosure can realize information sharing and real-time and (quasi-) synchronous updating of the shared information displayed by the two parties by using the communication window at the same time when the first electronic device and the second electronic device are in communication with each other, thus extending functions that can be realized by the communication, increasing interaction between the users of the two parties of communication, and enriching the user's experience.

The above are the descriptions of the information processing apparatus and the information processing method of the embodiments of the present disclosure by referring to FIGS. 1-15.

It is needed to specify that in the present specification, the terms of "comprise", "include" or any other variants intend to cover the meaning of non-exclusive containing, such that the process, method, object or apparatus comprising a series of elements not only comprise those elements but also comprise other elements not explicitly listed, or further comprise inherent elements for the process, method, object or apparatus. In a case of not having more limitations, the element defined by the expression of "comprising a" does not exclude that there are additional same elements in the process, method, object or apparatus comprising the element.

In addition, it is needed to be specify that in the present specification, the expressions such as "first . . . unit", "second . . . unit" are just for giving convenience to distinguish the descriptions, instead of meaning that it must be implemented as two or more physically-separated units. As a matter of fact, according to the needs, the unit as a whole may be implemented as one unit, or may be implemented as a plurality of unit.

Last, it is further needed to specify that the series of processes not only comprise processes performed in time sequence according to the sequence described herein, but also comprise processes performed concurrently, or respectively, instead of in time sequence.

According to the descriptions of the above implementations, those skilled in the art can clearly know that the present disclosure can be implemented by means of software in combination with necessary hardware platform, and of course, it can be implemented only by means of hardware. Based on such understanding, all or part of the distributions made by the technical solutions of the present disclosure to the background art can be reflected in a form of a software product, and the computer software product can be stored in a storage medium such as ROM/RAM, a disk and the like, including several instructions for enabling a computer apparatus (may be a personal computer, a server, or a network apparatus and so on) to perform the method described in respective embodiments or some parts of the embodiments.

In the embodiments of the present disclosure, unit/module can be implemented by software so as to be executed by various types of processors. For example, an identified executable code module can comprise one or more physical or logical blocks of the computer instructions. For example, it can be constructed as an object, a process, or a function. In spite of this, it is not necessary for identified executable code module to be physically located together, instead of comprising different instructions stored at different positions. When these instructions are combined together logically, they are composed of a unit/module and achieve a specified purpose of the unit/module.

In a case, that the unit/module can be utilized by software, in view of the existing hardware process level, for the unit/module that can be utilized by software, those skilled in the art can construct a corresponding hardware circuit to realize the corresponding function without considering the cost. The hardware circuit comprises a conventional a very-large-scale integration (VLSI) circuit or gate array and existing semiconductors such as logical chip, transistor, or other discrete elements. The module can further be realized by using a programmable hardware device such as a field-programmable gate array, a programmable array logic, a programmable logic device and so on.

The above are detailed descriptions of the present disclosure. The present disclosure applies specific examples to explain the principles and implementations of the present disclosure, and the specification for the above embodiments are just used for understanding the method of the present disclosure and its core concept; in the meantime, for those ordinary skilled in the art, changes may be made to the specific implementation and application range according to the concept of the present disclosure. To sum up, the contents of the specification shall not be understood as limitations to the present disclosure. Respective embodiments of the present disclosure are described in detail.

What is claimed is:

1. An information processing method being applicable to a first electronic device having a first display unit and a communication unit for communicating with a second electronic device, comprising:
    establishing a communication link between the first electronic device and the second electronic device;
    displaying a first communication interface used for communicating with the second electronic device on the first display unit;
    determining whether a predetermined condition is satisfied and obtaining a judgment result; and
    displaying a second communication interface used for communicating with the second electronic device on the first display unit when the determining result indicates that the predetermined condition is satisfied;
    wherein the second communication interface comprises a first area and a second area, the first area and the second area are at least partially overlapped, and the first area comprises a first subarea and a second subarea, the second subarea is used for displaying first video information acquired by the first electronic device, the first subarea is used for displaying second video information acquired by the second electronic device, the second area is used for displaying shared information, and at least a part of the shared information is simultaneously displayed on the first electronic device and the second electronic device;
    wherein the first area comprises a prompt identification, and the first communication interface comprises the first area;
    the step of judging whether a predetermined condition is satisfied comprises:
    judging whether the prompt identification is triggered;
    displaying a shared identification set when it is judged to trigger the prompt identification, and judging whether a shared identification in the shared identification set is triggered;
    the method further comprising:
    displaying a first operation interface when it is judged that a first shared identification in the shared identification set is triggered, the first operation interface comprising a plurality of candidate information;
    judging whether the shared information is determined from the plurality of candidate information;
    receiving a sharing operation for the shared information when it is judged that the shared information is determined from the plurality of candidate information;
    sending the shared information to the second electronic device in response to the sharing operation;
    wherein the shared information comprises a set of images; and
    wherein the set of images are displayed in a user designated area within the second area in at least one of a stacked or scattered manner.

2. The information processing method of claim 1, wherein the first electronic device is in video communication with the second electronic device through the communication unit, the first communication interface comprising a first video communication window used for displaying a video frame acquired by and transmitted from the second electronic device; the predetermined condition is that a sharing start-up instruction has been obtained;
    the information processing method further comprises:
    obtaining a sharing start-up instruction used for starting up a shared screen;
    wherein the first area of the second communication interface comprises the first video communication window and the second area of the second communication interface comprises the shared screen possessing a first shared display area;
    displaying the first shared display area on the first display unit; wherein a first part of the first shared display area is at least overlapped with a second part of the first video communication window; transparency of the first part is a first transparency, so that a first user of the first electronic device is able to view the video frame in the first video communication window through the first shared display area;
    wherein in a process of displaying the first shared display area on the first display unit, when the second electronic device enables the shared screen, a first part of a second shared display area possessed by the shared screen on the second electronic device is overlappedly displayed on a second part of a second video communication window on the second electronic device so that the second electronic device is able to synchronously display in the second shared display area an object displayed in the first shared display area.

3. The information processing method of claim 2, wherein said obtaining a sharing start-up instruction comprises:

detecting whether there is a first object dragged to the first video communication window and generates the sharing start-up instruction when it is detected that there is a first object dragged to the first video communication window, when or after the sharing start-up instruction is generated, the information processing method further comprises:

generating a sharing instruction;

displaying the first object on the first shared display area based on the sharing instruction.

4. The information processing method of claim 1, further comprising: receiving a first operation at the side of the first electronic device; generating a first operation instruction according to the first operation; updating the shared information displayed in the second area according to the first operation instruction; and sending the first operation instruction to the second electronic device;

wherein the second electronic device updates the at least part of the shared information displayed on the second electronic device according to the first operation instruction; or receiving a second operation instruction from the second electronic device; and updating the shared information displayed in the second area according to the second operation instruction;

wherein the second operation instruction is generated by the second electronic device receiving a second operation at the side of the second electronic device.

5. The information processing method of claim 4, wherein a size of the first shared display area is larger than or equal to that of the first video communication window, in a case that the size of the first shared display area is equal to the size of the first video communication window, the first shared display area is completely overlapped with the first video communication window;

in a case that the size of the first shared display area is larger than the size of the first video communication window, a first part of the first shared display area is completely overlapped with the first video communication window and is taken as a public area, the remaining part of the first shared display area is taken as a private area;

wherein a second object cannot be displayed on the second shared display area when it is displayed on the private area; a third object can be synchronously displayed on the second shared display area when it is displayed on the public area;

wherein the second object is operated in response to a first operation for the second object when the first operation is received; and the third object is operated in response to a second operation for the third object when the second operation is received and information of the second operation is sent to the second electronic device, so that the second electronic device displays the third object and operates the third object displayed on the second shared display area based on the second operation.

6. The information processing method of claim 1, wherein the step of judging whether a predetermined condition is satisfied comprises judging whether the shared information is received from the second electronic device.

7. The information processing method of claim 6, wherein the prompt identification is a turning-on shared screen button on the first communication interface, the judgment result indicates that the predetermined condition is satisfied when the turning-on shared screen button is triggered, and the second communication interface is generated by setting first video information acquired by the first electronic device in the second subarea, setting second video information acquired by the second electronic device in the first subarea, and setting the second area not including any shared information.

8. The information processing method of claim 1, further comprising:

displaying a second operation interface when it is judged that a second shared identification in the shared identification set is triggered;

receiving input information for the second operation interface; and obtaining shared information from a third electronic device being different from the first electronic device and the second electronic device based on the input information for the second operation interface.

9. An information processing apparatus being applicable to a first electronic device which comprises a first display unit and a communication unit and can communicate with a second electronic device through the communication unit, the information processing apparatus comprising:

a link establishing unit for establishing a communication link between the first electronic device and the second electronic device;

a first display processing unit for displaying a first communication interface used for communicating with the second electronic device on the first display unit;

a predetermined condition judged for judging whether a predetermined condition is satisfied and obtaining a judgement result; and a second display processing unit for displaying a second communication interface used for communicating with the second electronic device on the first display unit when the judgement result indicates that the predetermined condition is satisfied;

wherein the second communication interface comprises a first area and a second area, the first area and the second area are at least partially overlapped, and the first area comprises a first subarea and a second subarea, the second subarea is used for displaying first video information acquired by the first electronic device, the first subarea is used for displaying second video information acquired by the second electronic device, the second area is used for displaying shared information, and at least a part of the shared information is simultaneously displayed on the first electronic device and the second electronic device;

wherein the first area comprises a prompt identification, and the first communication interface comprises the first area;

the predetermined condition judging unit comprises:

a prompt triggering judging unit for judging whether the prompt identification is triggered;

a shared identification display processing unit for displaying a shared identification set when it is judges that the prompt identification is triggered, the shared identification set comprising at least one shared identification; and a shared identification judging unit for judging whether a shared identification in the shared identification set is triggered;

the apparatus further comprising:

a first operation interface displaying unit for displaying a first operation interface when it is judged that a first shared identification in the shared identification set is triggered, the first operation interface comprising a plurality of candidate information;

a shared information determining unit for judging whether the shared information is determined from the plurality of candidate information;

a sharing operation receiving unit for receiving a sharing operation for the shared information when it is judged that shared information is determined from the plurality of candidate information; and a shared information sending unit for sending the shared information to the second electronic device in response to the sharing operation;

wherein the shared information comprises a set of images; and wherein the set of images are displayed in a user designated area within the second area in at least one of a stacked or scattered manner.

10. The information processing apparatus of claim 9, wherein the first electronic device is in video communication with the second electronic device through the communication unit, the first communication interface comprises a first video communication window, and the first video communication window is used for displaying a video frame acquired by and transmitted from the second electronic device; the predetermined condition is that a sharing start-up instruction has been obtained;

the information processing apparatus further comprising:
a start-up instruction obtaining unit for obtaining a sharing start-up instruction, the sharing start-up instruction being used for starting up a shared screen;

wherein the first area of the second communication interface comprises the first video communication window and the second area of the second communication interface comprises the shared screen, the shared screen possessing a first shared display area;

displaying the first shared display area on the first display unit; wherein a first part of the first shared display area is at least overlapped with a second part of the first video communication window; transparency of the first part is a first transparency, so that a first user of the first electronic device is able to view the video frame in the first video communication window through the first shared display area;

wherein in a process of displaying the first shared display area on the first display unit, a first part of a second shared display area possessed by the shared screen is overlappedly displayed on a second part of the second video communication window when the second electronic device enables the shared screen, so that the second electronic device is able to synchronously display in the second shared display area an object displayed in the first shared display area.

11. The information processing apparatus of claim 10, wherein the start-up instruction obtaining unit detects whether there is a first object dragged to the first video communication window and generates the sharing start-up instruction when it is detected that there is a first object dragged to the first video communication window, wherein the information processing apparatus further comprises a sharing instruction obtaining unit for generating a sharing instruction when or after the sharing start-up instruction is generated, wherein the second display processing unit displays the first object on the first shared display area based on the sharing instruction.

12. The information processing apparatus of claim 9, further comprising:

a first operation receiving unit for receiving a first operation at the side of the first electronic device;

a first operation instruction generating unit for generating a first operation instruction according to the first operation;

an updating unit for updating the shared information displayed in the second area according to the first operation instruction; and the first operation instruction sending unit for sending the first operation instruction to the second electronic device;

wherein the second electronic device updates the at least part of the shared information displayed on the second electronic device according to the first operation instruction, wherein the information processing apparatus further comprises: a second operation instruction receiving unit for receiving a second operation instruction from the second electronic device, wherein the second operation instruction is generated by the second electronic device receiving a second operation at the side of the second electronic device;

the updating unit updates the shared information displayed in the second area according to the second operation instruction.

13. The information processing apparatus of claim 12, wherein a size of the first shared display area is larger than or equal to a size of the first video communication window, in a case that the size of the first shared display area is equal to the size of the first video communication window, the first shared display area is completely overlapped with the first video communication window; and in a case that the size of the first shared display area is larger than the size of the first video communication window, a first part of the first shared display area is completely overlapped with the first video communication window and is taken as a public area, and the remaining part of the first shared display area is taken as a private area;

wherein a second object cannot be displayed on the second shared display area when it is displayed on the private area; a third object can be synchronously displayed on the second shared display area when it is displayed on the public area;

wherein the first operation instruction generating unit generates a first operation instruction in response to a first operation for the second object when the first operation receiving unit receives the first operation, and the updating unit operates the second object according to the first operation instruction; and the first operation instruction generating unit generates the first operation instruction in response to a second operation for the third object when the first operation receiving unit receives the second operation, and the updating unit operates the third object according to the first operation instruction, and the first operation instruction sending unit sends the first operation instruction corresponding to the second operation to the second electronic device, so that the second electronic device displays the third object and operates the third object displayed on the second shared display area based on the second operation.

14. The information processing system of claim 9, the predetermined condition judging unit comprises a sharing information receiving unit for judging whether the shared information is received from the second electronic device.

15. The information processing apparatus of claim 14, wherein the prompt identification is a turning-on shared screen button on the first communication interface, when the turning-on shared screen button is triggered, the start-up instruction obtaining unit obtains the sharing start-up instruction, the judgment result obtained from the predetermined condition judging unit indicates that the predetermined condition is satisfied, and the second display processing unit generates the second communication interface by setting first video information acquired by the first electronic device in the second subarea, setting second video information acquired by the second electronic device in the first subarea, and setting the second area not including any shared information.

16. The information processing apparatus of claim 9, further composing:
- a second operation interface displaying unit for displaying a second operation interface when it is judged that a second shared identification in the shared identification set is triggered;
- an input information receiving unit for receiving input information for the second operation interface; and
- an obtaining unit for obtaining the shared information from a third electronic device being different from the first electronic device and the second electronic device based on the input information for the second operation interface.

* * * * *